US012623412B2

(12) United States Patent
Ahn et al.

(10) Patent No.: US 12,623,412 B2
(45) Date of Patent: May 12, 2026

(54) FORMING END EFFECTOR AND METHODS OF USE

(71) Applicant: The Boeing Company, Arlington, VA (US)

(72) Inventors: Jonathan Young Ahn, Seattle, WA (US); Christopher Robert Brown, Seattle, WA (US); Karina Elizabeth Mealey, San Luis Obispo, CA (US); Ricardo Andreas Fritzke, Sammamish, WA (US); Alexander K. Strait, Seattle, WA (US); Colin Noronha, Burien, WA (US); Kurtis Shuldberg Willden, Kent, WA (US)

(73) Assignee: The Boeing Company, Arlington, VA (US)

( * ) Notice: Subject to any disclaimer, the term of this patent is extended or adjusted under 35 U.S.C. 154(b) by 95 days.

(21) Appl. No.: 18/439,621

(22) Filed: Feb. 12, 2024

(65) Prior Publication Data
US 2025/0256469 A1      Aug. 14, 2025

(51) Int. Cl.
| | |
|---|---|
| *B29C 70/30* | (2006.01) |
| *B29C 70/34* | (2006.01) |
| *B29C 70/44* | (2006.01) |
| B29L 31/30 | (2006.01) |

(52) U.S. Cl.
CPC .......... *B29C 70/342* (2013.01); *B29C 70/446* (2013.01); *B29L 2031/3076* (2013.01)

(58) Field of Classification Search
CPC ..... B29C 70/541; B29C 70/543; B29C 70/56; B29C 2043/3602; B29C 43/361; B29C 2043/3613; B29C 2043/3621; B29C 2043/3649
See application file for complete search history.

(56) References Cited

U.S. PATENT DOCUMENTS

| | | | | |
|---|---|---|---|---|
| 4,648,934 A | * | 3/1987 | Kiss | B27N 5/02 |
| | | | | 425/374 |
| 8,236,222 B2 | | 8/2012 | Henderson et al. | |
| 10,875,260 B2 | | 12/2020 | Studley et al. | |
| 2016/0089841 A1 | * | 3/2016 | Studley | B29D 99/0003 |
| | | | | 264/258 |
| 2022/0143911 A1 | * | 5/2022 | Zhou | B29C 64/379 |

(Continued)

FOREIGN PATENT DOCUMENTS

EP           4019234 A2      6/2022

OTHER PUBLICATIONS

Hirai, K. M. Hirose, Y. Haikawa, T. Takenaka, The Development of Honda Humanoid Robot, Proceedings of the 1998 IEEE International Conference on Robotics & Automation (1998), pp. 1321-1326. (Year: 1998).*

(Continued)

*Primary Examiner* — Matthew J Daniels
(74) *Attorney, Agent, or Firm* — Yee & Associates, P.C.

(57) ABSTRACT
A forming end effector and methods of use are presented. Methods of forming a composite material onto a mandrel are presented. A forming end effector carrying the composite material is positioned over the mandrel. The forming end effector is connected to the mandrel. The composite material is swept onto the mandrel using sweepers of the forming end effector.

24 Claims, 22 Drawing Sheets

(56) References Cited

U.S. PATENT DOCUMENTS

2023/0391410 A1* 12/2023 Hutter ................. B62D 57/032

OTHER PUBLICATIONS

Qi, R. , T.L. Lam, Y. Xu, Design and Implementation of a Low-Cost and Lightweight Inflatable Robot Finger, 2014 IEEE/RSJ Conference on Intelligent Robots and Systems (2014), pp. 28-33. (Year: 2014).*
Tella, R., J.R. Birk, R.B. Kelley, General Purpose Hands for Bin-Picking Robots, IEEE Transactions on Systems, Man, and Cybernetics, vol. SMC-12, No. 6 (Nov./Dec. 1982), pp. 828-837. (Year: 1982).*
Partial European Search Report, dated Jul. 10, 2025, regarding EPO Application No. 25152480.7, 11 pages.

* cited by examiner

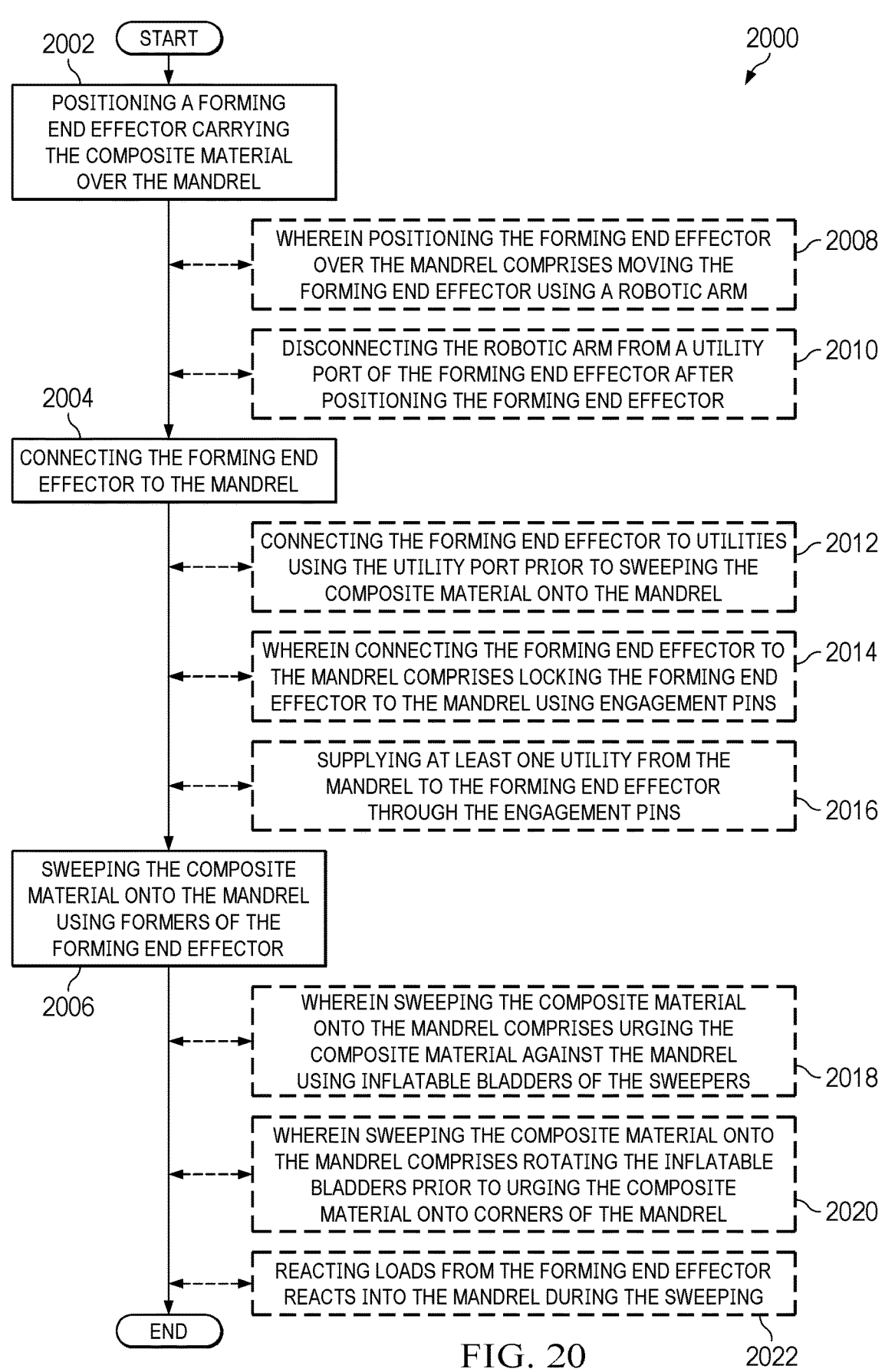

2002 (START)    2000

2002
POSITIONING A FORMING
END EFFECTOR CARRYING
THE COMPOSITE MATERIAL
OVER THE MANDREL

WHEREIN POSITIONING THE FORMING END EFFECTOR
OVER THE MANDREL COMPRISES MOVING THE
FORMING END EFFECTOR USING A ROBOTIC ARM — 2008

DISCONNECTING THE ROBOTIC ARM FROM A UTILITY
PORT OF THE FORMING END EFFECTOR AFTER
POSITIONING THE FORMING END EFFECTOR — 2010

2004
CONNECTING THE FORMING END
EFFECTOR TO THE MANDREL

CONNECTING THE FORMING END EFFECTOR TO UTILITIES — 2012
USING THE UTILITY PORT PRIOR TO SWEEPING THE
COMPOSITE MATERIAL ONTO THE MANDREL

WHEREIN CONNECTING THE FORMING END EFFECTOR TO — 2014
THE MANDREL COMPRISES LOCKING THE FORMING END
EFFECTOR TO THE MANDREL USING ENGAGEMENT PINS

SUPPLYING AT LEAST ONE UTILITY FROM THE
MANDREL TO THE FORMING END EFFECTOR
THROUGH THE ENGAGEMENT PINS — 2016

SWEEPING THE COMPOSITE
MATERIAL ONTO THE MANDREL
USING FORMERS OF THE
FORMING END EFFECTOR

2006

WHEREIN SWEEPING THE COMPOSITE MATERIAL
ONTO THE MANDREL COMPRISES URGING THE
COMPOSITE MATERIAL AGAINST THE MANDREL
USING INFLATABLE BLADDERS OF THE SWEEPERS — 2018

WHEREIN SWEEPING THE COMPOSITE MATERIAL ONTO
THE MANDREL COMPRISES ROTATING THE INFLATABLE
BLADDERS PRIOR TO URGING THE COMPOSITE
MATERIAL ONTO CORNERS OF THE MANDREL — 2020

REACTING LOADS FROM THE FORMING END EFFECTOR
REACTS INTO THE MANDREL DURING THE SWEEPING (END)

2202 — SPECIFICATION AND DESIGN

2204 — MATERIAL PROCUREMENT

2206 — COMPONENT AND SUBASSEMBLY MANUFACTURING

2208 — SYSTEM INTEGRATION

2210 — CERTIFICATION AND DELIVERY

2212 — IN SERVICE

2214 — MAINTENANCE AND SERVICE

2300

AIRCRAFT

2302 — AIRFRAME     INTERIOR — 2306

SYSTEMS

PROPULSION SYSTEM     ELECTRICAL SYSTEM 2308   2312     2310   2314

HYDRAULIC SYSTEM     ENVIRONMENTAL SYSTEM

2304

FORMING END EFFECTOR AND METHODS OF USE

BACKGROUND INFORMATION

1. Field

The present disclosure relates generally to shaping composite material and more specifically to a forming end effector configured to shape composite material onto a mandrel.

2. Background

Currently, gantry formers can be used to form a composite material onto a mandrel. However, gantry formers have a limited work envelope. Gantry formers cannot accommodate more than a few degrees of tool tilting.

Robots are capable of orienting to unique angles for tasks. However, robots are not as rigid as gantries.

Therefore, it would be desirable to have a method and apparatus that takes into account at least some of the issues discussed above, as well as other possible issues. It would be desirable to provide an alternative method of forming composite material onto a mandrel.

SUMMARY

An embodiment of the present disclosure provides a method of forming a composite material onto a mandrel. A forming end effector carrying the composite material is positioned over the mandrel. The forming end effector is connected to the mandrel. The composite material is swept onto the mandrel using sweepers of the forming end effector.

Another embodiment of the present disclosure provides a forming end effector for forming a composite material. The forming end effector comprises a frame, a number of legs movably connected to the frame, and forming heads with sweepers movably connected to the frame by a number of actuators movably connected to the frame. The number of legs has engagement pins configured to connect the forming end effector to a mandrel.

Yet another embodiment of the present disclosure provides a forming end effector for forming a composite material. The forming end effector comprises a frame; a number of actuators movably connected to the frame; and forming heads with sweepers movably connected to the frame by the number of actuators. The number of actuators is connected to the forming heads by pairs of hinges such that the forming heads are configured to rotate to form the composite material.

A further embodiment of the present disclosure provides a method. A composite material is formed onto a mandrel using sweepers of a forming end effector. Loads from the forming end effector are reacted into the mandrel during forming of the composite material.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

FIG. 20 is a flowchart of a method of forming a composite material onto a mandrel in accordance with an illustrative embodiment;

DETAILED DESCRIPTION

Figure 1:
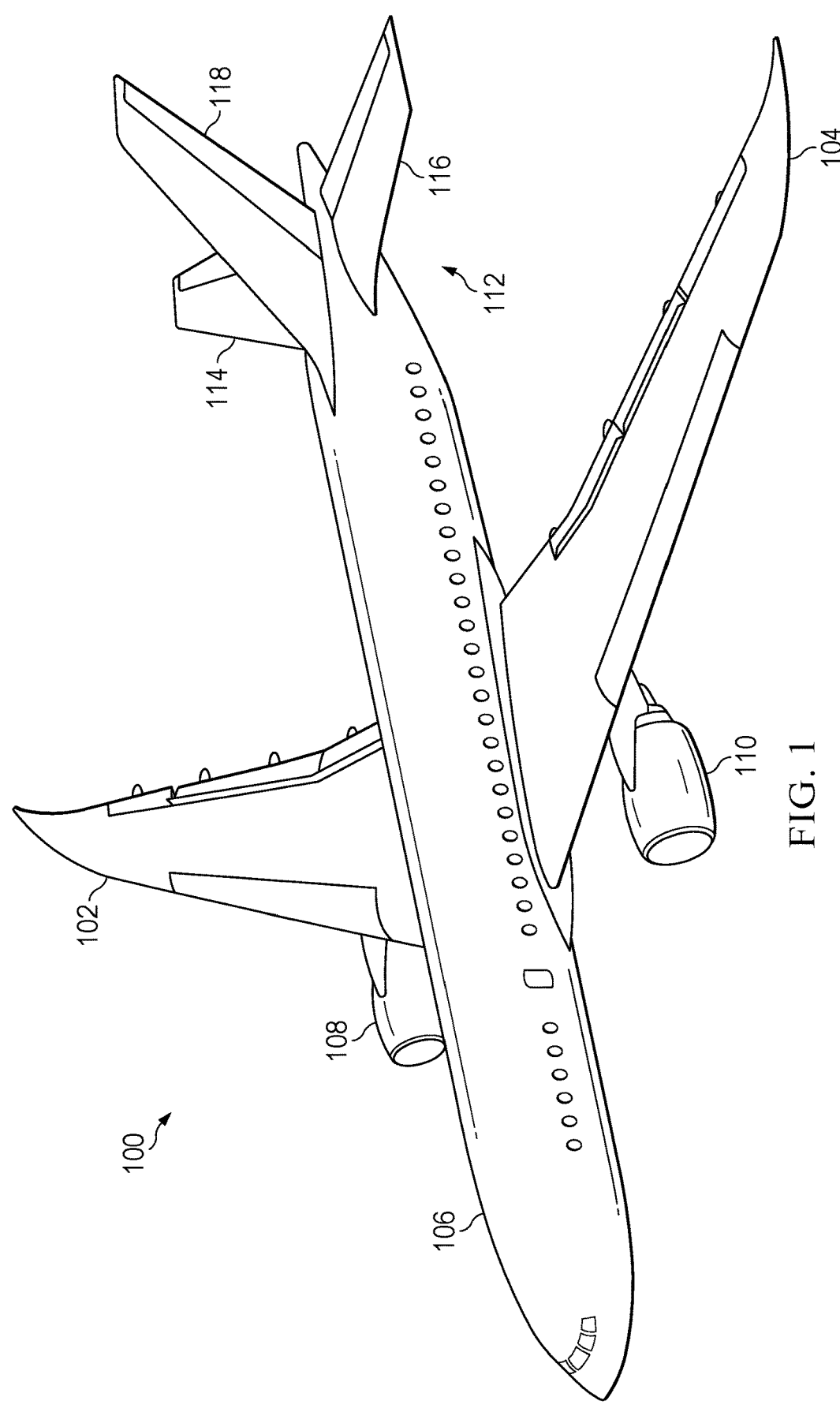
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have a composite structure formed using a forming end effector of the illustrative examples. A composite structure in wing 102, wing 104, body 106, or tail section 112 can be made using the forming end effector of the illustrative examples.

Figure 2:
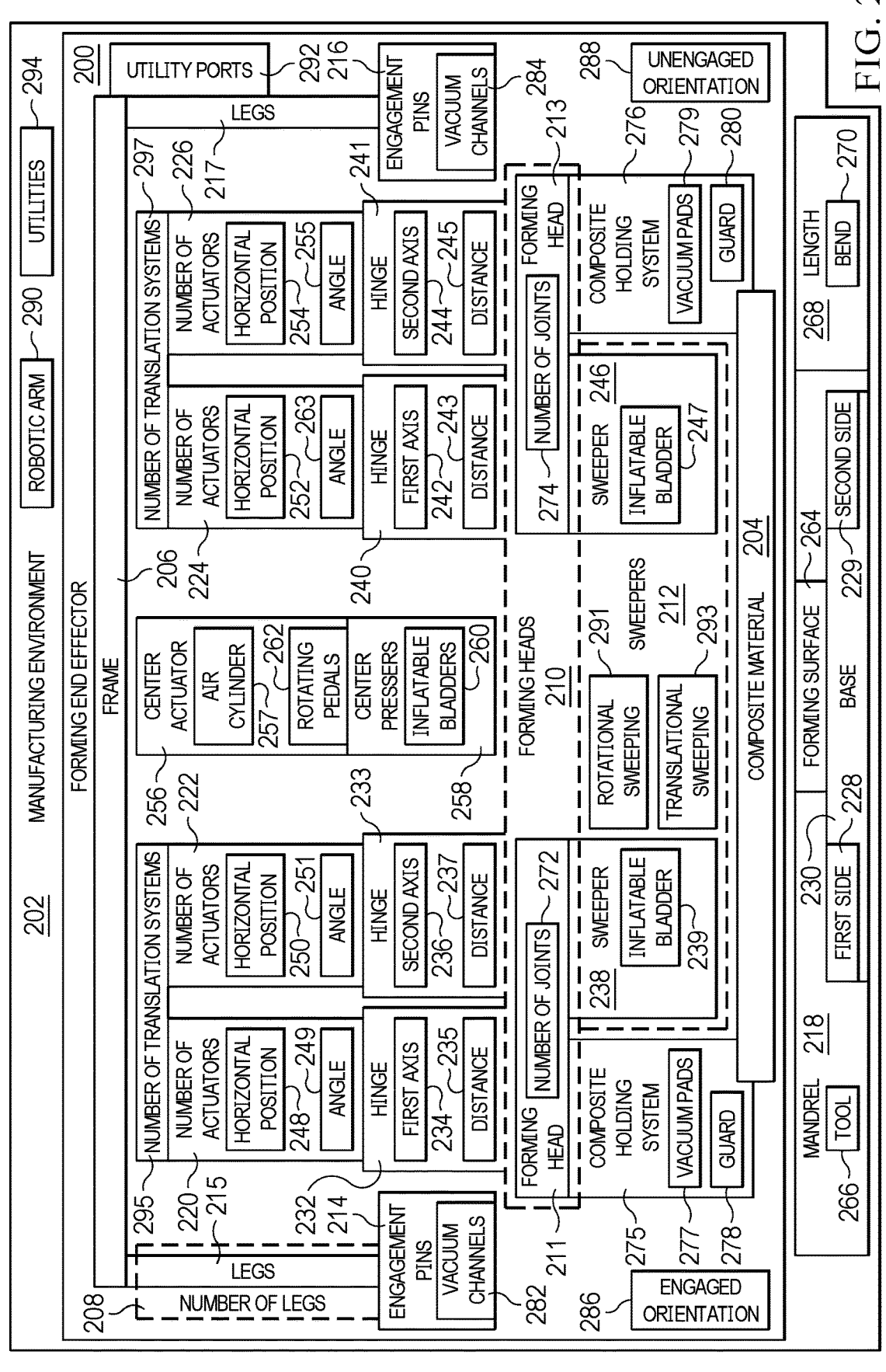
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Forming end effector 200 is used within manufacturing environment 202 for forming composite material 204.

Forming end effector 200 comprises frame 206, number of legs 208, and forming heads 210 with sweepers 212. Number of legs 208 is movably connected to frame 206. Number of legs 208 has engagement pins 214 and engagement pins 216. Number of legs 208 comprises legs 215 and legs 217. Legs 215 and legs 217 are on opposite sides of frame 206. Legs 215 and legs 217 are on opposite sides of center actuator 256.

Engagement pins 214 and engagement pins 216 are configured to connect forming end effector 200 to mandrel 218. Legs 215 connect to mandrel 218 on an opposite side of mandrel 218 than legs 217. Legs 215 are configured to connect to first side 228 of base 230 of mandrel 218 while legs 217 connect to second side 229 of base 230 of mandrel 218.

Mandrel 218 takes the form of tool 266 upon which composite material 204 will be applied and formed. Composite material 204 is formed onto forming surface 264 by sweeping composite material 204 using sweepers 212 of forming end effector 200. Mandrel 218 further comprises base 230 onto which forming end effector 200 connects.

Forming end effector 200 can be moved between engaged orientation 286 and unengaged orientation 288 to connect or disconnect forming end effector 200 to mandrel 218. Engaged orientation 286 is an orientation for forming end effector 200 to be connected to mandrel 218. When in engaged orientation 286, forming end effector 200 can be used for forming composite material 204 to mandrel 218. Unengaged orientation 288 is an orientation for forming end effector 200 to be moved onto or away from mandrel 218. When in unengaged orientation 288, legs 215 and legs 217 of forming end effector 200 can be used for forming composite material 204 to mandrel 218.

Forming heads 210 with sweepers 212 are movably connected to frame 206 by a number of actuators movably connected to frame 206. Forming heads 210 with sweepers 212 are movably connected to frame 206 by number of actuators 220, number of actuators 222, number of actuators 224, and number of actuators 226.

As depicted, forming heads 210 comprise forming head 211 and forming head 213. Forming head 211 is attached to number of actuators 220 and number of actuators 222.

Forming heads 210 are connected to the number of actuators by pairs of hinges configured to rotate the sweepers relative to mandrel 218 beneath frame 206. In this illustrative example, for forming head 211, the pairs of hinges comprise hinge 232 and hinge 233. Forming head 211 is connected to number of actuators 220 by hinge 232. Forming head 211 is connected to number of actuators 222 by hinge 233. Hinge 232 has first axis 234 distance 235 from forming head 211. Hinge 233 has second axis 236 distance 237 from forming head 211. Distance 235 is different from distance 237 such that actuating one of number of actuators 220 or number of actuators 222 rotates sweeper 238.

The horizontal positions, angles, and extensions of actuators control the movement of a respective forming head and its respective sweeper. For example, horizontal position 248, angle 249 and an extension of number of actuators 220 as well as horizontal position 250, angle 251, and an extension of number of actuators 222 can control the rotational sweeping 291 and translational sweeping 293 of sweeper 238. The use of rotational sweeping 291 and translational sweeping 293 for sweepers, such as inflatable bladders, allows the ability to control the compaction force and pulling tension independently. Number of translation systems 295 can be used to modify at least one of horizontal position 248 or angle 249 of number of actuators 220 or horizontal position 250 or angle 251 of number of actuators 222. Number of translation systems 295 can comprise at least one of bearings, railings, or carts.

In this illustrative example, for forming head 213, the pairs of hinges comprise hinge 240 and hinge 241. Forming head 213 is connected to number of actuators 224 by hinge 240. Forming head 213 is connected to number of actuators 226 by hinge 241. Hinge 240 has first axis 242 distance 243 from forming head 213. Hinge 241 has second axis 244 distance 245 from forming head 213. Distance 243 is different from distance 245 such that actuating one of number of actuators 224 or number of actuators 226 rotates sweeper 246.

The horizontal positions, angles, and extensions of actuators control the movement of a respective forming head and its respective sweeper. For example, horizontal position 252, angle 253, and an extension of number of actuators 224 as well as horizontal position 254, angle 255, and an extension of number of actuators 226 can control the rotational sweeping and translational sweeping of sweeper 246. Number of translation systems 297 can be used to modify at least one of horizontal position 252 or angle 253 of number of actuators 224 or horizontal position 254 or angle 255 of number of actuators 226. Number of translation systems 297 can comprise at least one of bearings, railings, or carts.

In some illustrative examples, sweepers 212 take the form of inflatable bladders. In this illustrative example, sweeper 238 takes the form of inflatable bladder 239. In this illustrative example, sweeper 246 takes the form of inflatable bladder 247.

Using number of actuators 220 and number of actuators 222, sweeper 238 is used to sweep composite material 204 onto forming surface 264. Number of actuators 220 and number of actuators 222 are used to perform both rotational sweeping 291 and translational sweeping 293 of composite material 204 onto forming surface 264. Number of actuators 220 and number of actuators 222 are used to rotate sweeper 238 around a corner of forming surface 264 to reduce undesirable pulling of composite material 204. Using rotational sweeping 291, sweeper 238 continues to compress composite material 204 while sweeper 238 is moving around a corner of forming surface 264. During translational sweeping 293, sweeper 238 moves along forming surface 264 to pull composite material 204 along forming surface 264.

Using number of actuators 224 and number of actuators 226, sweeper 246 is used to sweep composite material 204 onto forming surface 264. Number of actuators 224 and number of actuators 226 are used to perform both rotational sweeping 291 and translational sweeping 293 of composite material 204 onto forming surface 264. Number of actuators 224 and number of actuators 226 are used to rotate sweeper 246 around a corner of forming surface 264 to reduce undesirable pulling of composite material 204. Using rotational sweeping 291, sweeper 246 continues to compress composite material 204 while sweeper 246 is moving around a corner of forming surface 264. During translational sweeping 293, sweeper 246 moves along forming surface 264 to pull composite material 204 along forming surface 264.

In some illustrative examples, forming heads 210 further comprise vacuum pads configured to hold composite material 204 prior to forming. As depicted, forming head 211 further comprises composite holding system 275 configured to hold composite material 204 prior to forming. Composite holding system 275 comprises vacuum pads 277 and guard 278. Guard 278 is a mechanical component to safeguard composite material 204 while transporting composite material 204.

As depicted, forming head 213 further comprises composite holding system 276 configured to hold composite material 204 prior to forming. Composite holding system 276 comprises vacuum pads 279 and guard 280. Guard 280 is a mechanical component to safeguard composite material 204 while transporting composite material 204.

Forming end effector 200 further comprises center actuator 256 connected to frame 206 between forming heads 210. Center pressers 258 are movably connected to center actuator 256. In some illustrative examples, center pressers 258 comprise inflatable bladders 260 movably connected to center actuator 256. In this illustrative example, center pressers 258 are connected to center actuator 256 by rotating pedals 262. In some illustrative examples, center actuator 256 takes the form of air cylinder 257.

Center actuator 256 is used to compress composite material 204 against forming surface 264 of mandrel 218 during forming of composite material 204. In some illustrative examples, when center pressers 258 take the form of inflatable bladders 260, inflatable bladders 260 can be inactive when forming end effector 200 is not forming composite material 204. In some illustrative examples, inflatable bladders 260 are uninflated for space conservation when forming end effector 200 is not actively forming composite material 204. To utilize inflatable bladders 260 for compacting composite material 204, inflatable bladders 260 are inflated and rotating pedals 262 are rotated outwardly to compress composite material 204 on forming surface 264.

Forming end effector 200 can be transported to mandrel 218 by robotic arm 290. Forming end effector 200 can form and shape composite material 204 onto forming surface 264 without being connected to robotic arm 290. Robotic arm 290 can be used to transport and place a plurality of forming end effectors to apply composite materials to mandrel 218. By forming end effector 200 performing forming operations without being attached to robotic arm 290, fewer robotic arms can be used in manufacturing environment 202. Further, by having several independently operated forming end effectors including forming end effector 200, composite material 204 can be applied to mandrel 218 in a more efficient manner.

Forming end effector 200 can be connected to forming end effector 200 through utility port 292. Utility port 292 is connected to frame 206. Utility port 292 is configured to interface with robotic arm 290 for transportation of forming end effector 200 and is configured to interface with utilities 294 for forming operations independently of robotic arm 290. Utilities 294 can be provided to forming end effector 200 through utility port 292 through a manufacturing floor of manufacturing environment 202.

In some illustrative examples, engagement pins are further configured to receive at least one utility through the engagement pins and transport the utility to other components of the forming end effector. In some illustrative examples, engagement pins 214 are configured to receive at least one utility of utilities 294 through engagement pins 214. In some illustrative examples, engagement pins 214 are configured to receive a utility from mandrel 218.

In some illustrative examples, engagement pins 214 comprise vacuum channels 282. Vacuum channels 282 can be used to provide a resource such as a vacuum or pneumatic pressure to forming end effector 200. In some illustrative examples, vacuum channels 282 are present in engagement pins 214 to receive at least one utility from mandrel 218. In some illustrative examples, air pressure is supplied to forming end effector 200 from mandrel 218 through engagement pins 214.

In some illustrative examples, engagement pins 216 comprise vacuum channels 284. Vacuum channels 284 can be used to provide a resource such as a vacuum or pneumatic pressure to forming end effector 200. In some illustrative examples, vacuum channels 284 are present in engagement pins 216 to receive at least one utility from mandrel 218. In some illustrative examples, air pressure is supplied to forming end effector 200 from mandrel 218 through engagement pins 216.

In some illustrative examples, loads from forming end effector 200 react loads into mandrel 218 during the sweeping. In some illustrative examples, reacting loads from forming end effector 200 comprises reacting loads from forming end effector 200 through legs 215 and legs 217 of forming end effector 200 connected to mandrel 218. In some illustrative examples, reacting loads from forming end effector 200 comprises reacting loads from forming end effector 200 through engagement pins 214 and engagement pins 216 of legs 215 and legs 217. In some illustrative examples, connection to mandrel 218 through engagement pins 214 and engagement pins 216 will react loads from forming end effector 200 to mandrel 218 during forming of composite material 204. Reacting the loads from forming composite material 204 into mandrel 218 allows for use of forming end effector 200 rather than a larger gantry system.

In some illustrative examples, forming end effector 200 comprises frame 206, number of actuators 220, 222, 224, and 226 movably connected to frame 206, and forming heads 210 with sweepers 212 movably connected to frame 206 by number of actuators 220, 222, 224, and 226. Number of actuators 220, 222, 224, and 226 connected to forming heads 210 by pairs of hinges such that forming heads 210 are configured to rotate to form composite material 204. Forming end effector 200 further comprises a number of legs 208 movably connected to frame 206. The number of legs 208 have engagement pins, engagement pins 214 and engagement pins 216, configured to connect forming end effector 200 to mandrel 218 and react loads from forming end effector 200 into mandrel 218 during forming of composite material 204.

In some illustrative examples, each of forming heads 210 comprises a set of compliant joints to provide forming of composite material 204 on mandrel 218 with bend 270. Bend 270 is perpendicular to length 268 of mandrel 218. Bend 270 can be a vertical bend or a horizontal bend in mandrel 218. In some illustrative examples, the set of compliant joints can be used to accommodate bend 270 in either a horizontal or vertical direction of mandrel 218.

The illustration of manufacturing environment 202 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, sweepers 212 can take the form of a different type of sweeper than inflatable bladders 260. In some illustrative examples, sweepers 212 can take the form of foam sweepers, squeegees, or other acceptable forms of sweepers.

Figure 3:
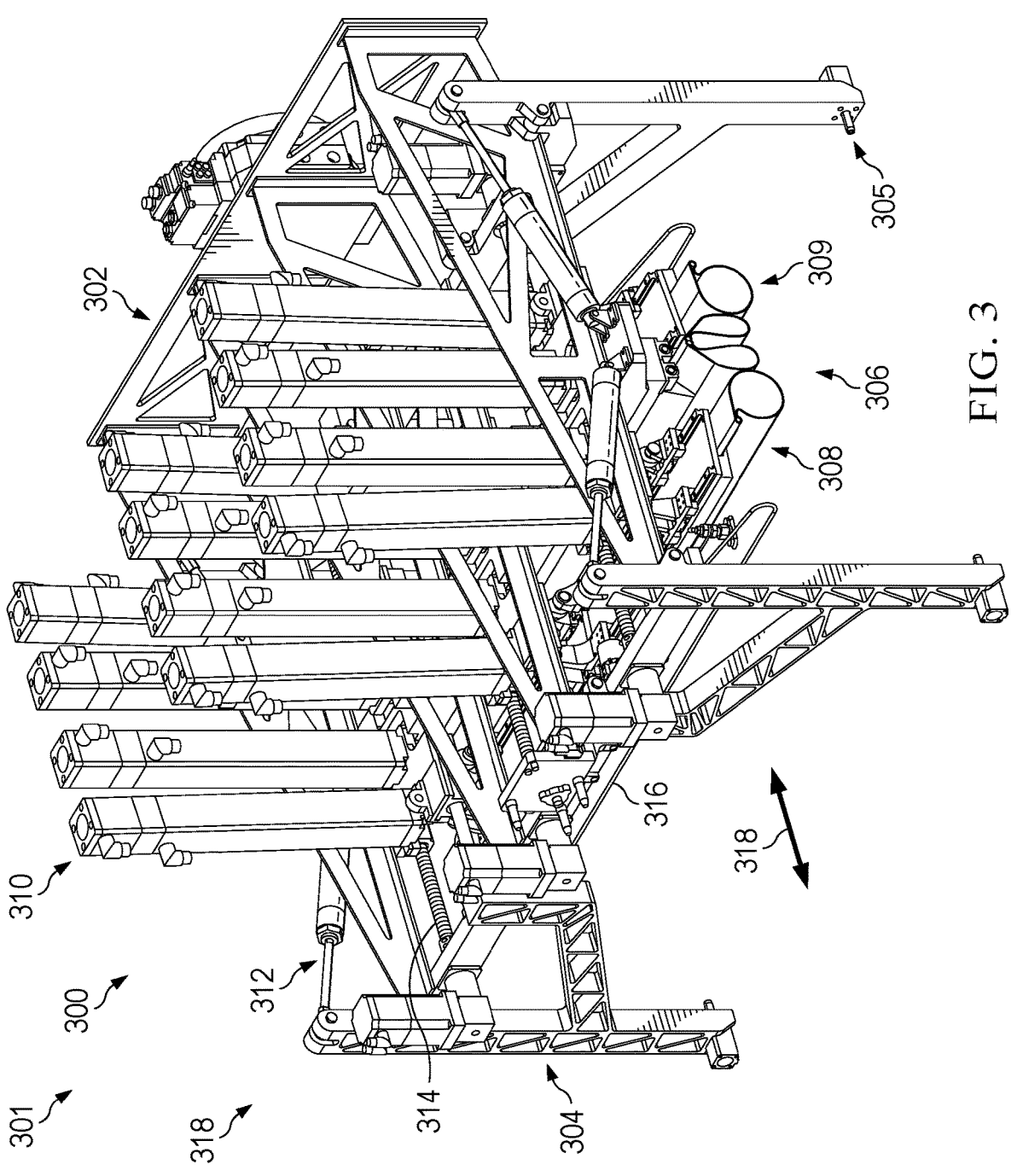
FIG. 3 is an illustration of an isometric view of a forming end effector in an engaged orientation in accordance with an illustrative embodiment.

Turning now to FIG. 3, an illustration of an isometric view of a forming end effector in an engaged orientation is depicted in accordance with an illustrative embodiment. Forming end effector 300 is a physical implementation of forming end effector 200 of FIG. 2.

Forming end effector 300 comprises frame 302, number of legs 304 movably connected to frame 302, and forming heads 306 with sweepers 308 movably connected to frame 302 by number of actuators 310 movably connected to frame 302. As can be seen in view 301, number of legs 304 can be moved by actuators 312. As depicted, actuators 312 are hydraulic actuators. Number of legs 304 has engagement pins 305 configured to connect forming end effector 300 to a mandrel. In some illustrative examples, engagement pins 305 react loads from the forming end effector 300 into the mandrel during forming of the composite material. In some illustrative examples, engagement pins 305 provide a number of utilities from the mandrel to forming end effector 300. In some illustrative examples, engagement pins 305 are hollow and act as a conduit for providing hydraulic pressure from the mandrel to forming end effector 300. In some illustrative examples, engagement pins 305 are further configured to receive at least one utility through engagement pins 305 and transport the utility to other components of forming end effector 300.

Number of legs 304 are movably connected to frame 302 to allow for application and removal of forming end effector 300 to a mandrel. The forming end effector 300 can be applied to a mandrel, form a composite material, and then be removed from the mandrel. The forming end effector 300 can be used serially across a mandrel. The forming end effector 300 can be used on a plurality of different mandrels.

In view 301 of forming end effector 300, forming end effector 300 is in engaged orientation 318. Engaged orientation 318 is an orientation for forming end effector 300 to be connected to a mandrel. When in engaged orientation 318, forming end effector 300 can be used for forming a composite material to the mandrel.

To form a composite material to a mandrel, number of actuators 310 move along number of translation systems 314. In some illustrative examples, number of translation systems 314 comprise a number of cart and rail systems. In these illustrative examples, number of actuators 310 are connected to a number of cart and rail systems to move number of actuators 310 in a horizontal direction relative to frame 302. When an actuator of number of actuators 310 moves in a horizontal direction, the actuator moves towards one pair of legs in number of legs 304 and away from another pair of legs in number of legs.

In some illustrative examples, forming end effector 300 can transport the composite material (not depicted) to be formed. As depicted, forming end effector 300 comprises composite holding system 316. Composite holding system 316 allows forming end effector 300 to carry a composite material as the forming end effector 300 is moved to a mandrel and connected to the mandrel.

As depicted, sweepers 308 take the form of inflatable bladders 309. In other illustrative examples, sweepers 308 can take the form of squeegees or other forms of sweepers capable of reaching all indentations and surface features.

Forming heads 306 are connected to number of actuators 310 by pairs of hinges configured to rotate sweepers 308 relative to a mandrel beneath frame 302. The hinges and number of actuators 310 are configured to enable translational sweeping of sweepers 308. The hinges and number of actuators 310 are configured to enable independent rotational sweeping of sweepers 308. The rotational sweeping allows for sweepers 308 to rotate around a corner of a forming surface of a mandrel.

Figure 4:
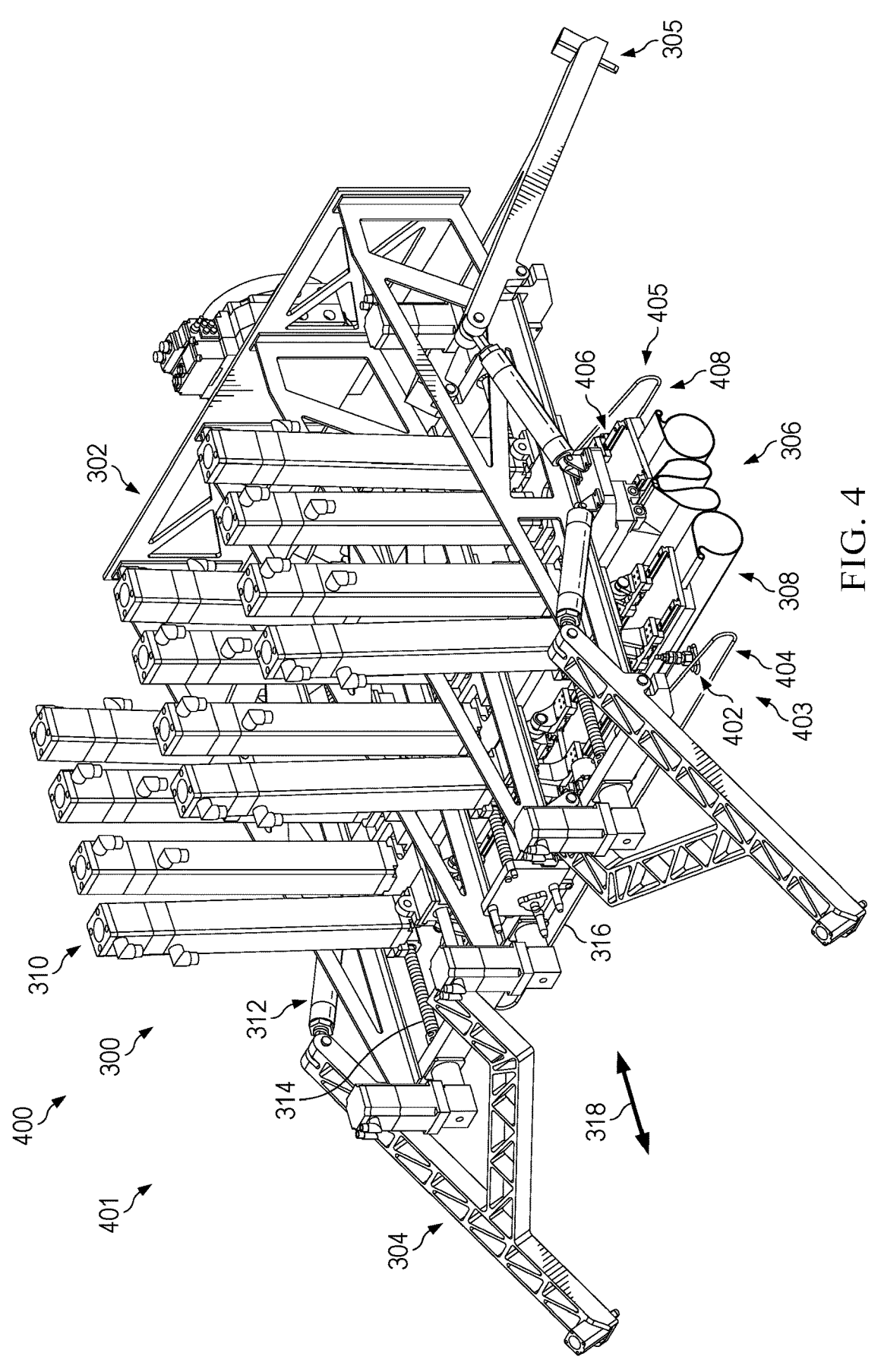
FIG. 4 is an illustration of an isometric view of a forming end effector in an unengaged orientation in accordance with an illustrative embodiment.

Turning now to FIG. 4, an illustration of an isometric view of a forming end effector in an unengaged orientation is depicted in accordance with an illustrative embodiment. View 400 is a view of forming end effector 300 in unengaged orientation 401. Forming end effector 300 can be transported to a mandrel or away from a mandrel in unengaged orientation 401.

In view 400, composite holding systems of forming end effector 300 are visible. Forming end effector 300 comprises composite holding system 403 and composite holding system 405.

Forming heads 306 further comprises vacuum pads 402 configured to hold the composite material prior to forming. In this illustrative example, composite holding system 403 comprises vacuum pads 402 configured to hold composite material prior to forming. Composite holding system 403 further comprises guard 404. Guard 404 is a mechanical component to safeguard composite material while transporting composite material.

Forming heads 306 further comprise vacuum pads 406 configured to hold the composite material prior to forming. In this illustrative example, composite holding system 405 comprises vacuum pads 406 configured to hold composite material prior to forming. Composite holding system 405 further comprises guard 408. Guard 408 is a mechanical component to safeguard composite material while transporting composite material.

Figure 5:
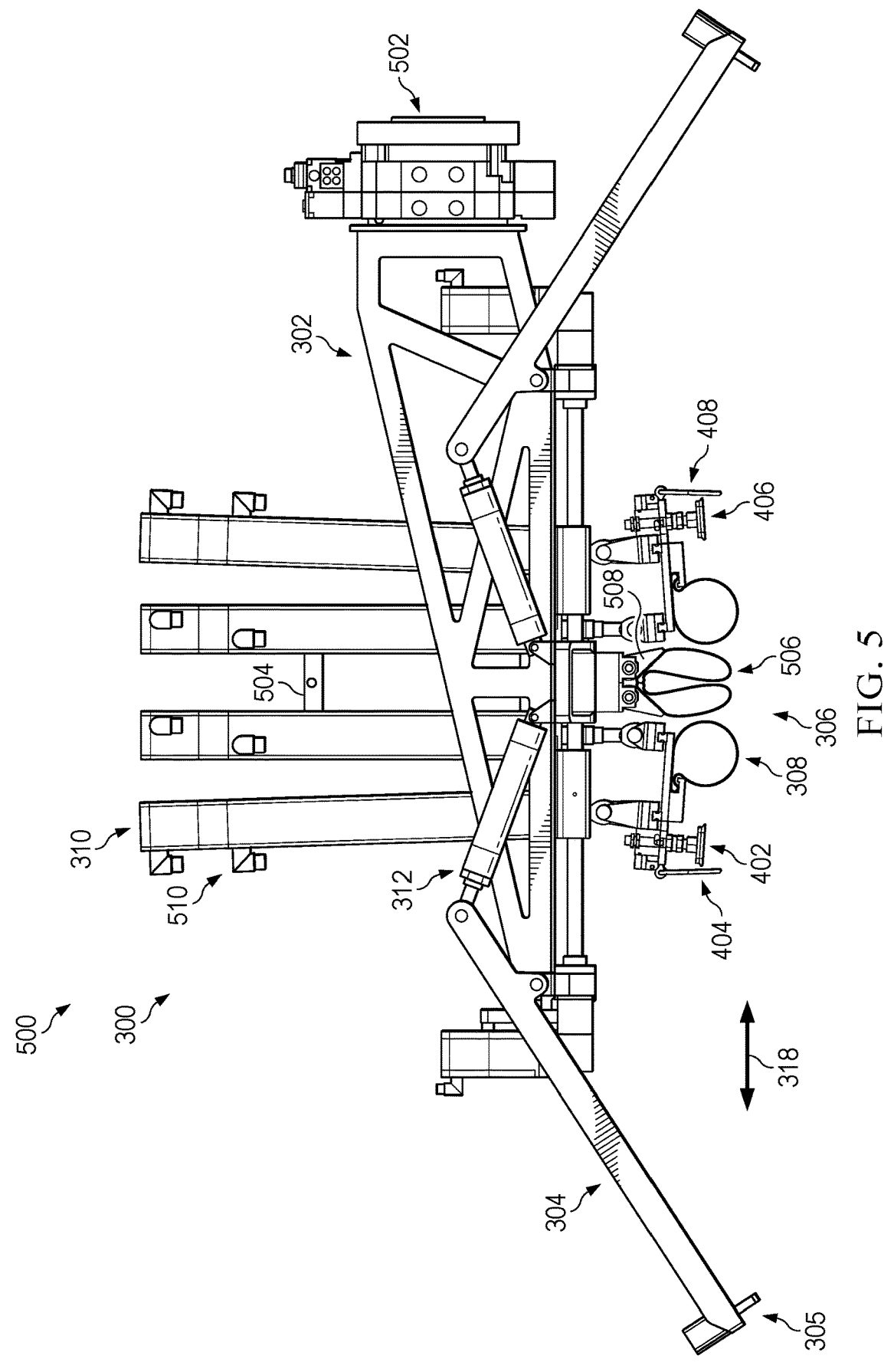
FIG. 5 is an illustration of a front view of a forming end effector in an unengaged orientation in accordance with an illustrative embodiment.

Turning now to FIG. 5, an illustration of a front view of a forming end effector in an unengaged orientation is depicted in accordance with an illustrative embodiment. View 500 is a front view of forming end effector 300. In view 500 forming end effector 300 is in unengaged orientation 401.

Forming end effector 300 comprises center actuator 504 connected to frame 302 between forming heads 306. Center pressers 506 are movably connected to center actuator 504.

The center pressers 506 comprise inflatable bladders movably connected to center actuator 504.

Utility port 502 is connected to frame 302. Utility port 502 is configured to interface with a robotic arm for transportation of forming end effector 300. Utility port 502 is also configured to interface with utilities for forming operations independently of a robotic arm. Utility port 502 allows for powering and operating forming end effector 300 without the robot staying connected.

Figure 6:
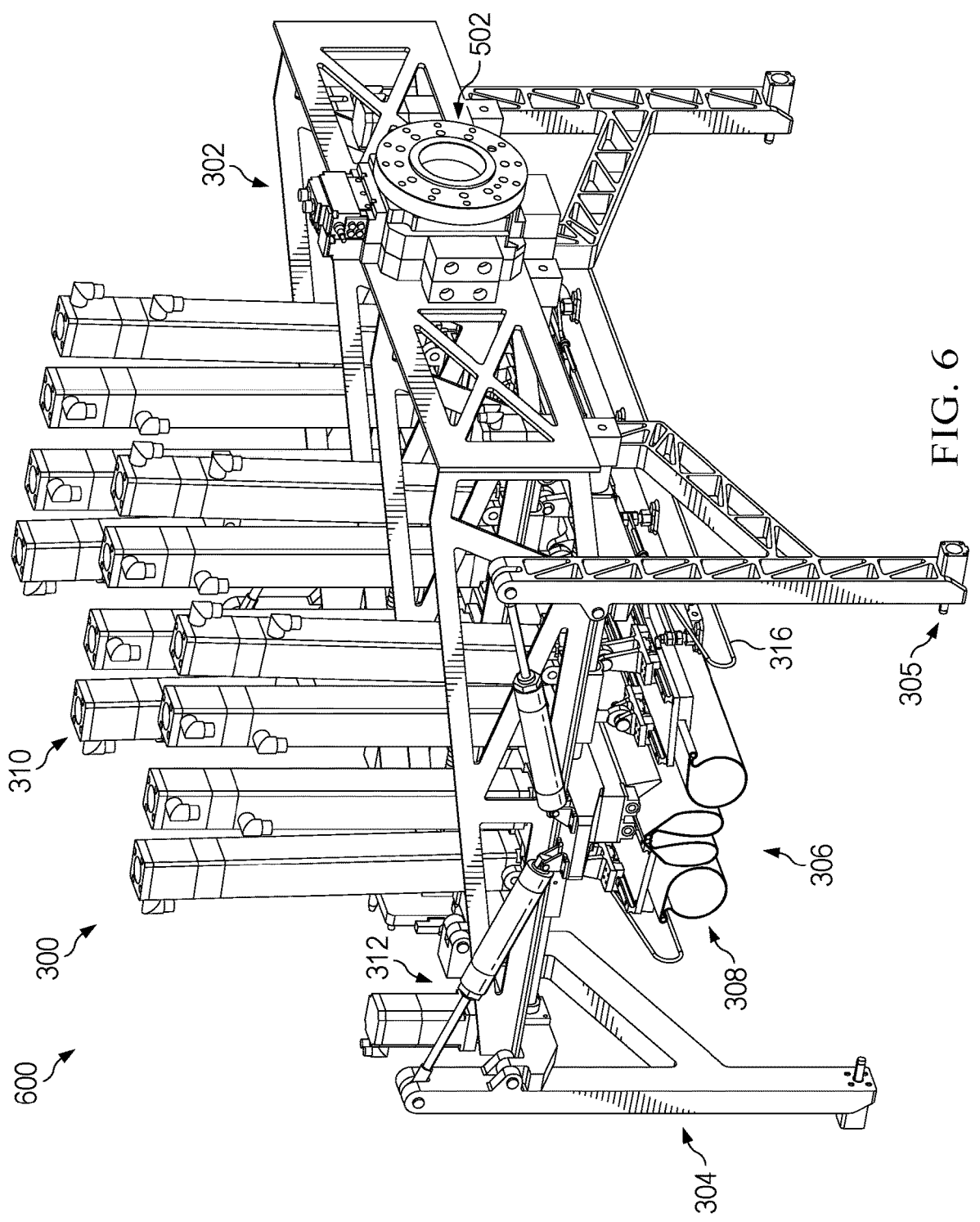
FIG. 6 is an illustration of an isometric view of a forming end effector in an engaged orientation in accordance with an illustrative embodiment.

Turning now to FIG. 6, an illustration of an isometric view of a forming end effector in an engaged orientation is depicted in accordance with an illustrative embodiment. In view 600 of forming end effector 300, utility port 502 is visible. As depicted, utility port 502 takes the form of a robotic tool changer.

Figure 7:
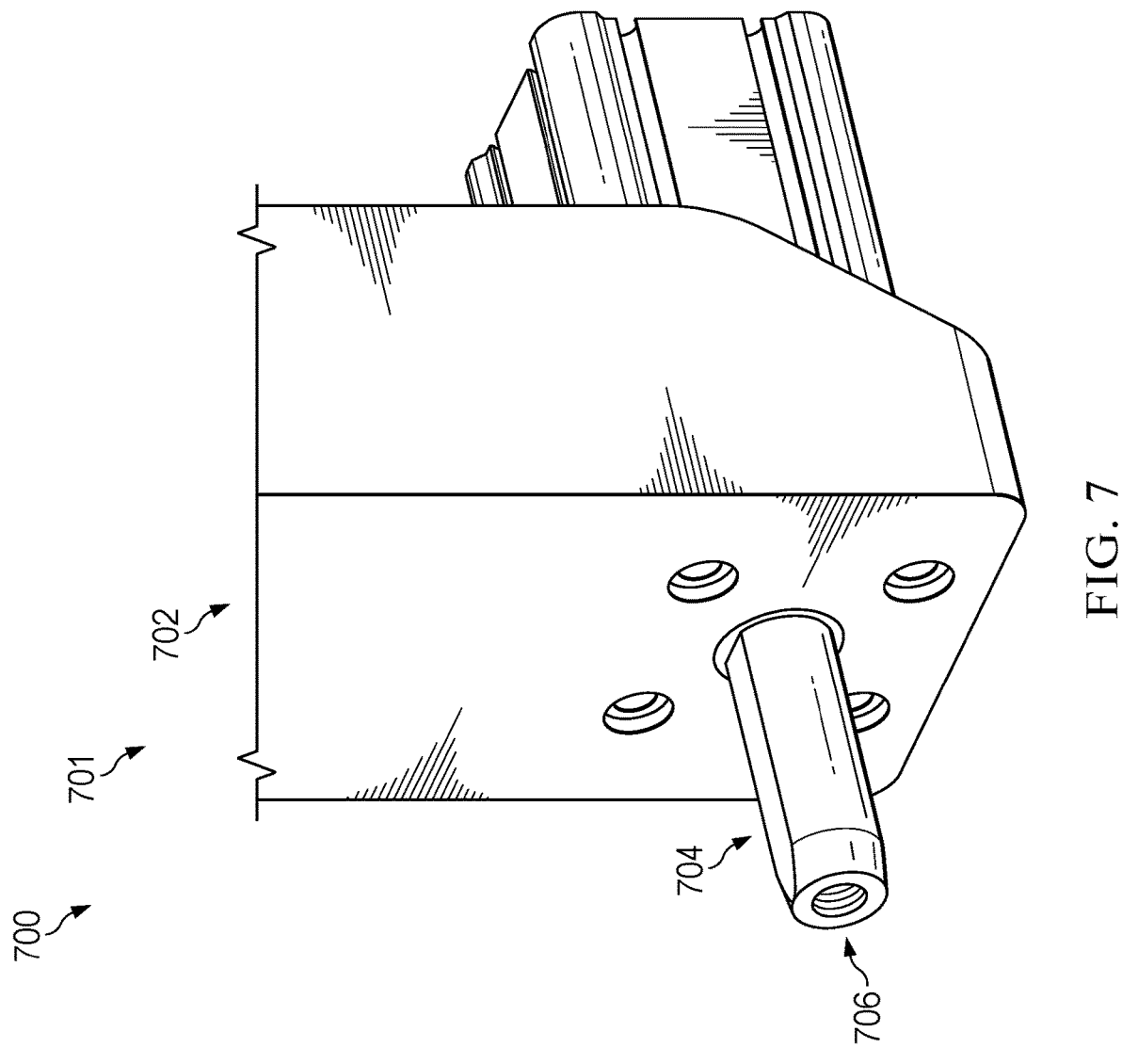
FIG. 7 is an illustration of an isometric view of an engagement pin on a leg of a forming end effector in accordance with an illustrative embodiment.

Turning now to FIG. 7, an illustration of an isometric view of an engagement pin on a leg of a forming end effector is depicted in accordance with an illustrative embodiment. In view 700, engagement pin 704 is connected to leg 702 of forming end effector 701. Engagement pin 704 is a physical implementation of an engagement pin of engagement pins 214 of FIG. 2. Engagement pin 704 can be one of engagement pins 305 of FIGS. 3-6. Engagement pin 704 comprises vacuum channel 706. Vacuum channel 706 can be used to provide a resource such as a vacuum or pneumatic pressure to forming end effector 701.

Engagement pin 704 can be used to connect forming end effector 701 to a mandrel. Connection to a mandrel through engagement pin 704 will react loads from forming end effector 701 to the mandrel during forming of a composite material.

Figure 8:
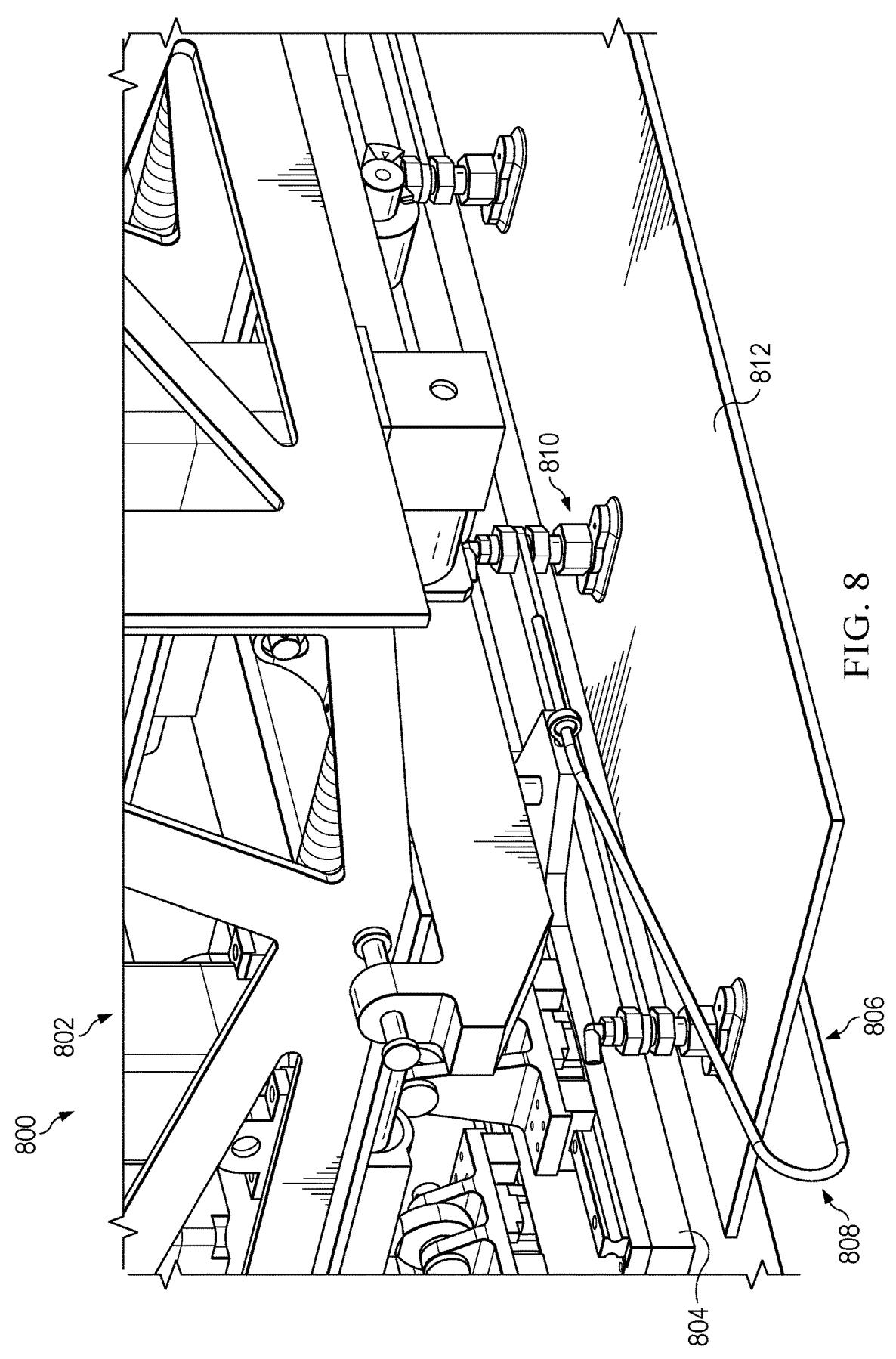
FIG. 8 is an illustration of an isometric view of a composite holding system of a forming end effector in accordance with an illustrative embodiment.

Turning now to FIG. 8, an illustration of an isometric view of a composite holding system of a forming end effector is depicted in accordance with an illustrative embodiment. View 800 is an isometric view of composite holding system 806 of forming end effector 802. Composite holding system 806 is a physical implementation of composite holding system 275 of FIG. 2. Composite holding system 806 can be the same as composite holding system 316 of FIGS. 3-6.

Composite holding system 806 is connected to forming head 804 of forming end effector 802. Composite holding system 806 is configured to hold composite material 812 to be formed by forming end effector 802. Composite holding system 806 allows forming end effector 802 to hold and carry composite material 812 to the mandrel upon which composite material 812 will be formed.

Composite holding system 806 comprises vacuum pads 810 configured to hold composite material 812 prior to forming. Composite holding system 806 further comprises guard 808. Guard 808 is a mechanical component to safeguard composite material 812 while transporting composite material 812.

Figure 9:
FIG. 9 is an illustration of a front view of a forming end effector in an engaged orientation and connected to a mandrel in accordance with an illustrative embodiment.

Turning now to FIG. 9, an illustration of a front view of a forming end effector in an engaged orientation and connected to a mandrel is depicted in accordance with an illustrative embodiment. In view 900 forming end effector 902 is connected to mandrel 904. Forming end effector 902 is a physical implementation of forming end effector 200 of FIG. 2. Forming end effector 902 can be the same as forming end effector 300 of FIGS. 3-6. In some illustrative examples, forming end effector 902 is connected to mandrel 904 by engagement pin 704 of FIG. 7. In some illustrative examples, forming end effector 902 is the same as forming end effector 802 of FIG. 8.

In view 900, forming end effector 902 is at the beginning of the forming process. Forming end effector 902 comprises frame 901, number of legs 908 movably connected to frame 901, and forming heads 914 with sweepers 916. Number of legs 908 have engagement pins (not depicted) configured to connect forming end effector 902 to mandrel 904 and react loads from forming end effector 902 into mandrel 904 during forming of a composite material.

In view 900, forming end effector 902 is in engaged orientation 906. In engaged orientation 906, number of legs 908 of forming end effector 902 connect forming end effector 902 to mandrel 904. Mandrel 904 is a tool upon which forming end effector 902 will form composite material 917. Mandrel 904 comprises base 910 and forming surface 912. Base 910 is a portion of mandrel 904 configured to interface with forming end effector 902. In some illustrative examples, base 910 also interacts with a manufacturing floor. Forming surface 912 is a surface upon which composite material 917 will be formed. Forming surface 912 is the surface upon which sweepers 916 of forming end effector 902 will form composite material 917.

In view 900, sweepers 916 are in contact with composite material 917 to apply pressure to composite material 917 on forming surface 912. Center pressers 920 are not activated in view 900. In view 900, center pressers 920 are not yet inflated. Forming heads 914 with sweepers 916 movably connected to frame 901 by number of actuators 903. Number of actuators 903 is connected to forming heads 914 by pairs of hinges such that forming heads 914 are configured to rotate to form composite material 917.

Center actuator 918 is connected to frame 901 between forming heads 914. Center pressers 920 movably connected to center actuator 918. Center pressers 920 comprise inflatable bladders movably connected to center actuator 918.

Figure 10:
FIG. 10 is an illustration of a front view of a forming end effector in an engaged orientation and connected to a mandrel in accordance with an illustrative embodiment.

Turning now to FIG. 10, an illustration of a front view of a forming end effector in an engaged orientation and connected to a mandrel is depicted in accordance with an illustrative embodiment. Between view 900 and view 1000, forming heads 914 have moved relative to mandrel 904. In view 1000, the lateral inflatable bladders, sweepers 916, begin to sweep form outward. In view 1000, inflatable bladders 1020 of center pressers 920 push against the inside of inflatable bladders of sweepers 916 as center actuator 918 extends downward and rotating pedals 1018 rotate open.

In view 1000, actuators 903 comprise number of actuators 1002 and number of actuators 1008. In view 1000, forming heads 914 comprise forming head 1004 connected to number of actuators 1002 and forming head 1010 connected to number of actuators 1008. Actuators 1002 are connected to translation system 1006 and actuators 1008 are connected to translation system 1012. Between view 900 and view 1000, actuators 1002 and forming head 1004 have moved in direction 1014 away from center actuator 918. Between view 900 and view 1000, actuators 1008 and forming head 1010 have moved in direction 1016 away from center actuator 918. Between view 900 and view 1000, actuators 1002 and actuators 1008 have moved in opposite directions so that actuators 1002 and actuators 1008 move away from each other.

The horizontal positions, angles, and extensions of actuators 1002 control the movement of forming head 1004 and its respective sweeper. The horizontal positions, angles, and extensions of actuators 1002 are controlled to perform both rotational sweeping and translational sweeping. Between view 900 and view 1000, actuators 1002 moved in direction 1014 to create translational sweeping of composite material 917 by the sweeper of forming head 1004 in direction 1014.

The horizontal positions, angles, and extensions of actuators 1008 control the movement of forming head 1010 and its respective sweeper. The horizontal positions, angles, and extensions of actuators 1008 are controlled to perform both rotational sweeping and translational sweeping. Between view 900 and view 1000, actuators 1008 moved in direction 1016 to create translational sweeping of composite material 917 by the sweeper of forming head 1010 in direction 1016.

In view 1000, center pressers 920 is movably connected to center actuator 918 have been activated for compaction of composite material 917. In view 1000, center pressers 920 take the form of inflatable bladders 1020. Inflatable bladders 1020 are connected to rotating pedals 1018. Between view 900 and view 1000, rotating pedals have rotated outwardly to allow for inflation of inflatable bladders 1020.

Figure 11:
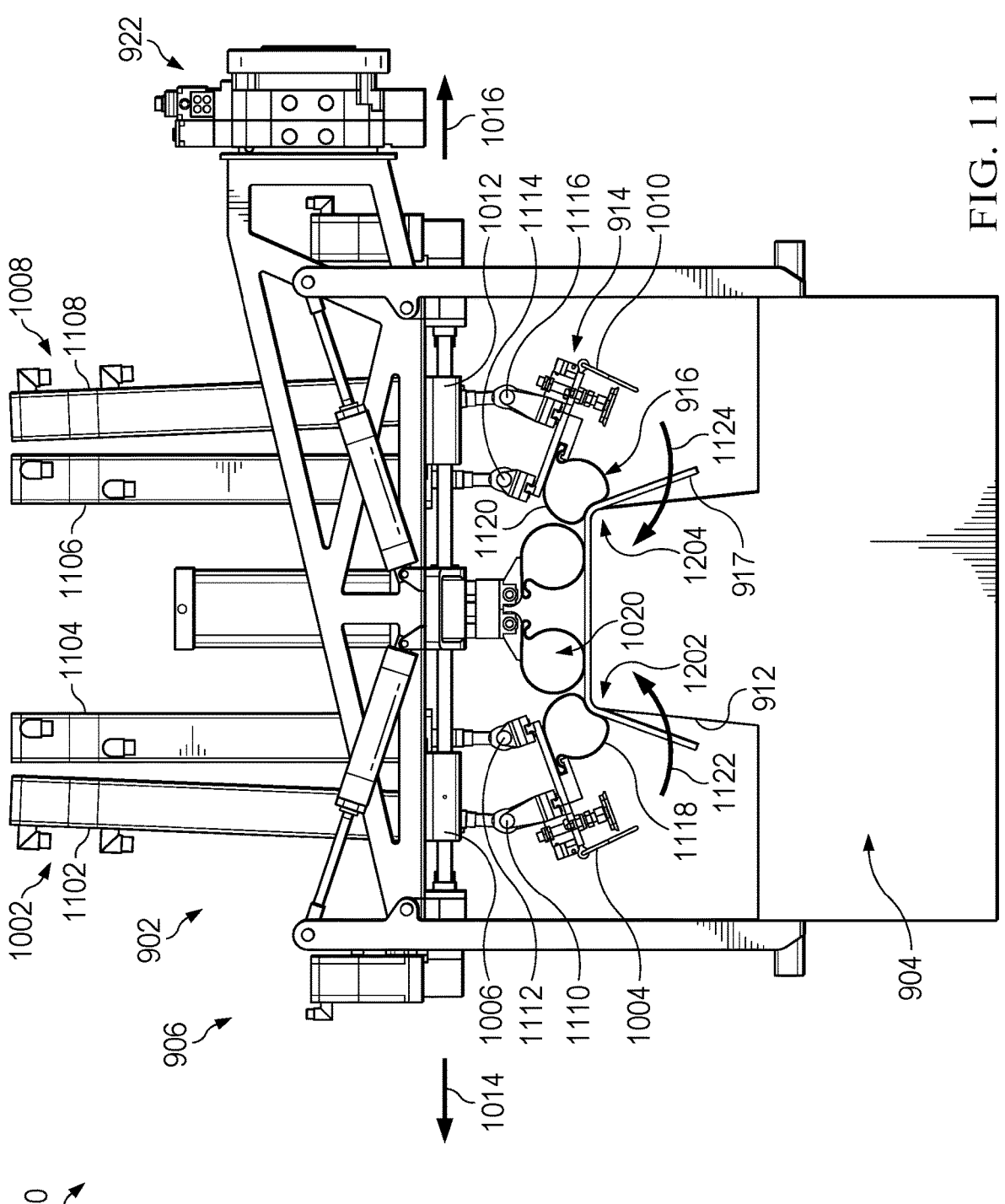
FIG. 11 is an illustration of a front view of a forming end effector in an engaged orientation and connected to a mandrel in accordance with an illustrative embodiment.

Turning now to FIG. 11, an illustration of a front view of a forming end effector in an engaged orientation and connected to a mandrel is depicted in accordance with an illustrative embodiment. In this illustrative example, sweepers 916 comprise inflatable bladders, inflatable bladder 1118 and inflatable bladder 1120. In view 1100, inflatable bladder 1118 and inflatable bladder 1120 begin to rotate about corner 1202 and corner 1204 of mandrel 904. In some illustrative examples, corner 1202 and corner 1204 can be referred to as radiuses. Between view 1000 and view 1100, the horizontal positions, angles, and extensions of actuators 1002 have changed to begin rotating inflatable bladder 1118 around corner 1202. Between view 1000 and view 1100, the horizontal positions, angles, and extensions of actuators 1008 have changed to begin rotating inflatable bladder 1120 around corner 1204.

In view 1100, inflatable bladder 1118 and inflatable bladder 1120 sweep, but begin to rotate around each corner of mandrel 904. Rotating forming head 1004 and forming head 1010 prevents undesirable amounts of pulling on composite material 917.

Actuators 1002 comprises actuator 1102 and actuator 1104. Actuator 1102 is connected to forming head 1004 by hinge 1110. Actuator 1104 is connected to forming head 1004 by hinge 1112. Hinge 1110 is a first distance away from forming head 1004 and hinge 1112 is a second distance away from forming head 1004. As can be seen in view 1100, a difference between the first distance and the second distance enables rotation of inflatable bladder 1118 for forming composite material 917 around edges such as corner 1202. As can be seen in view 1100, hinge 1110 is a greater distance from forming head 1004 than hinge 1112. By at least one of extending actuator 1102 and retracting actuator 1104, inflatable bladder 1118 is rotated in direction 1122.

Actuators 1008 comprises actuator 1106 and actuator 1108. Actuator 1106 is connected to forming head 1010 by hinge 1114. Actuator 1108 is connected to forming head 1010 by hinge 1116. Hinge 1114 is a first distance away from forming head 1010 and hinge 1116 is a second distance away from forming head 1010. As can be seen in view 1100, a difference between the first distance and the second distance enables rotation of inflatable bladder 1120 for forming composite material 917 around edges such as corner 1204. As can be seen in view 1100, hinge 1116 is a greater distance from forming head 1010 than hinge 1114. By at least one of extending actuator 1108 and retracting actuator 1106, inflatable bladder 1120 is rotated in direction 1124.

Figure 12:
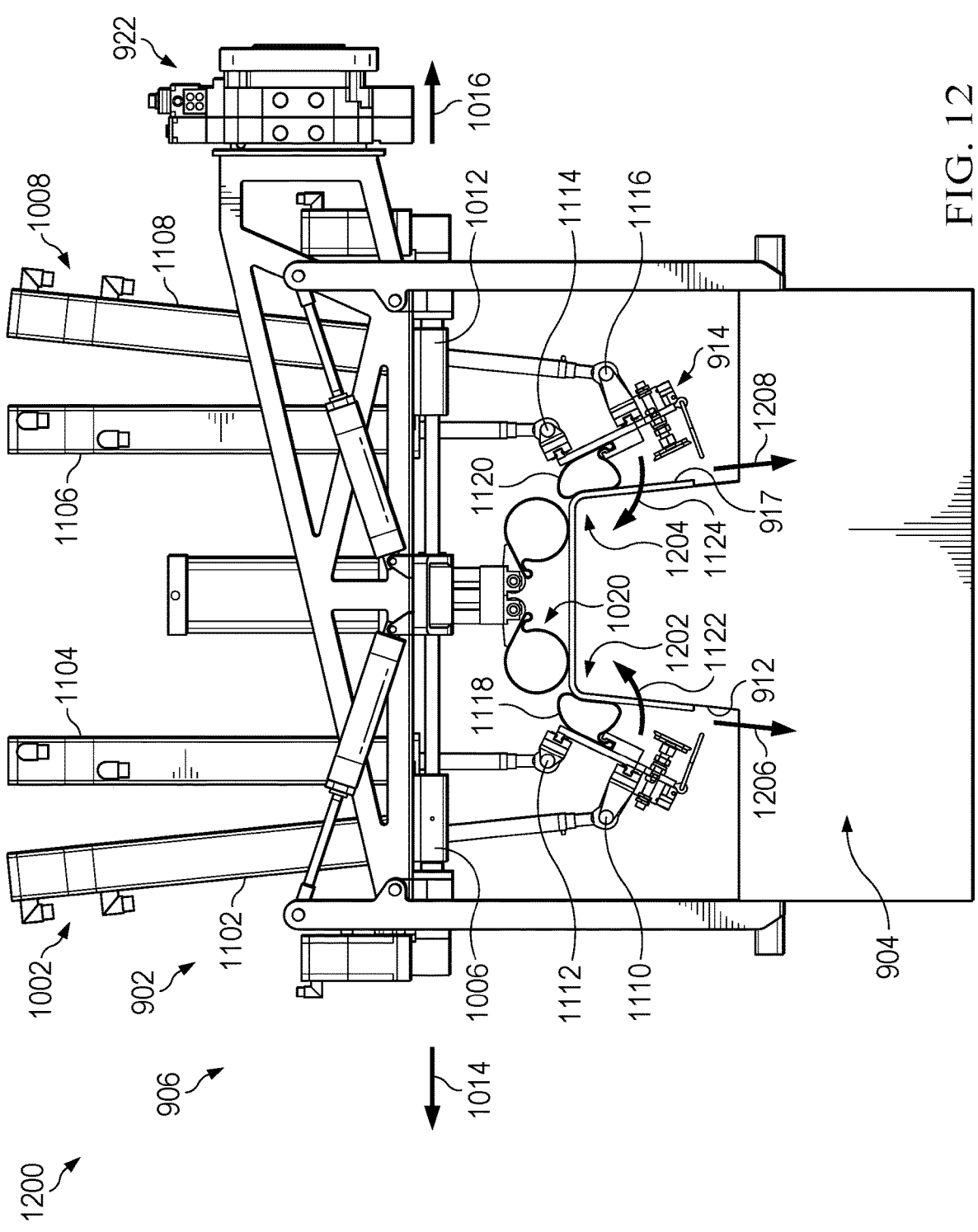
FIG. 12 is an illustration of a front view of a forming end effector in an engaged orientation and connected to a mandrel in accordance with an illustrative embodiment.

Turning now to FIG. 12, an illustration of a front view of a forming end effector in an engaged orientation and connected to a mandrel is depicted in accordance with an illustrative embodiment. In view 1200, inflatable bladder 1118 has rotated around corner 1202 in direction 1122 and is compacting composite material 917 against forming surface 912 of mandrel 904. In view 1200, rotation of inflatable bladder 1118 is complete and inflatable bladder 1118 begins translational sweeping in direction 1206 along forming surface 912.

In view 1200, inflatable bladder 1120 has rotated around corner 1204 in direction 1124 and is compacting composite material 917 against forming surface 912 of mandrel 904. In view 1200, rotation of inflatable bladder 1120 is complete and inflatable bladder 1120 begins translational sweeping in direction 1208 along forming surface 912.

Figure 13:
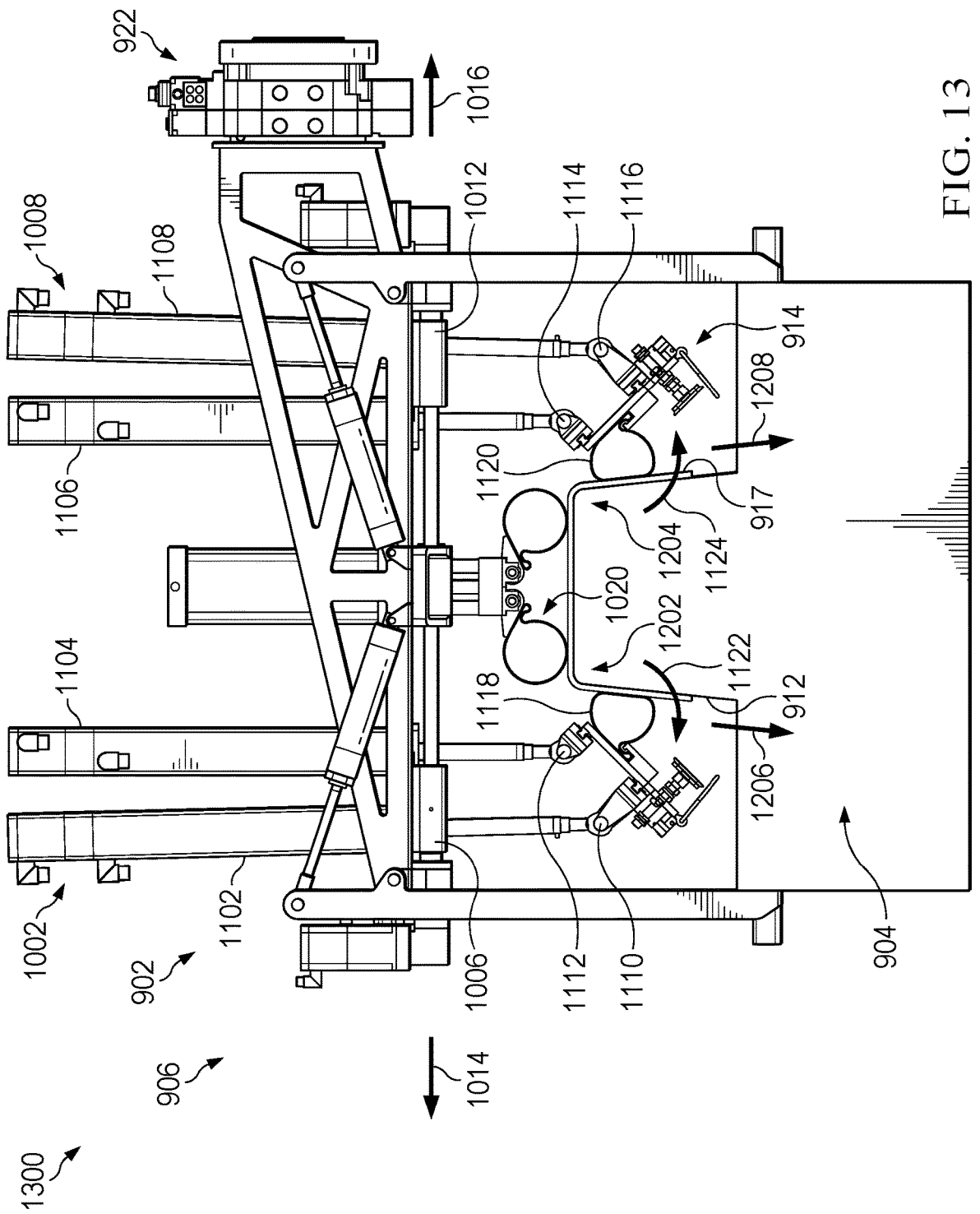
FIG. 13 is an illustration of a front view of a forming end effector in an engaged orientation and connected to a mandrel in accordance with an illustrative embodiment.

Turning now to FIG. 13, an illustration of a front view of a forming end effector in an engaged orientation and connected to a mandrel is depicted in accordance with an illustrative embodiment. In view 1300, inflatable bladder 1118 is being rotated in direction 1122. In view 1300, inflatable bladder 1120 is being rotated in direction 1124. Rotation of inflatable bladder 1118 in direction 1122 can be referred to as reverse rotation in this example.

In view 1300, inflatable bladder 1118 and inflatable bladder 1120 rotate in reverse to further sweep and pull composite material 917 as it nears the end of forming. In view 1300, actuator 1102 moves horizontally in direction 1014 to perform rotational sweeping and translational sweeping. Actuator 1104 is extended to perform rotational sweeping and translational sweeping. The cooperative interaction of actuator 1102 and actuator 1104 purposefully creates rotational motion.

Figure 14:
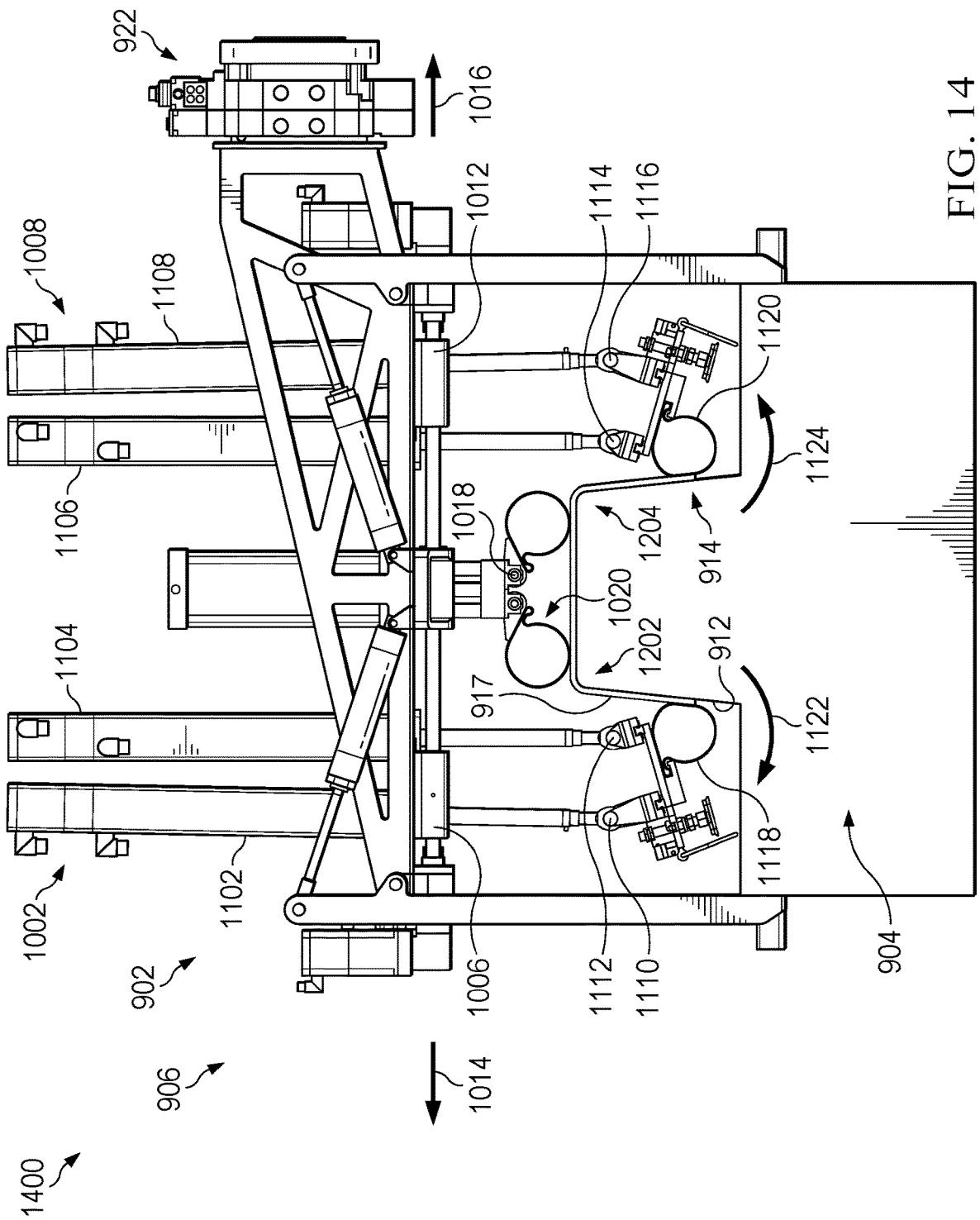
FIG. 14 is an illustration of a front view of a forming end effector in an engaged orientation and connected to a mandrel in accordance with an illustrative embodiment.

Turning now to FIG. 14, an illustration of a front view of a forming end effector in an engaged orientation and connected to a mandrel is depicted in accordance with an illustrative embodiment. In view 1400, inflatable bladder 1118 is being rotated in direction 1122. In view 1400, inflatable bladder 1120 is being rotated in direction 1124. Rotation of inflatable bladder 1120 in direction 1124 can be referred to as reverse rotation in this example.

Between view 1300 and view 1400, actuator 1106 has been extended to rotate inflatable bladder 1120 in direction 1124. Between view 1300 and view 1400, actuator 1106 has been extended to rotate inflatable bladder 1120 in direction 1124.

In view 1400, reverse rotation and pulling is depicted. In view 1400, rotational sweeping and translational sweeping is depicted. In view 1400, the translational sweeping comprises movement of inflatable bladder 1118 down forming surface 912 away from corner 1202. In view 1400, the translational sweeping comprises movement of inflatable bladder 1120 down forming surface 912 away from corner 1204. Rotational sweeping and translational sweeping while compacting the last bit of composite material 917 will prevent the layers from peeling back and wrinkling.

Figure 15:
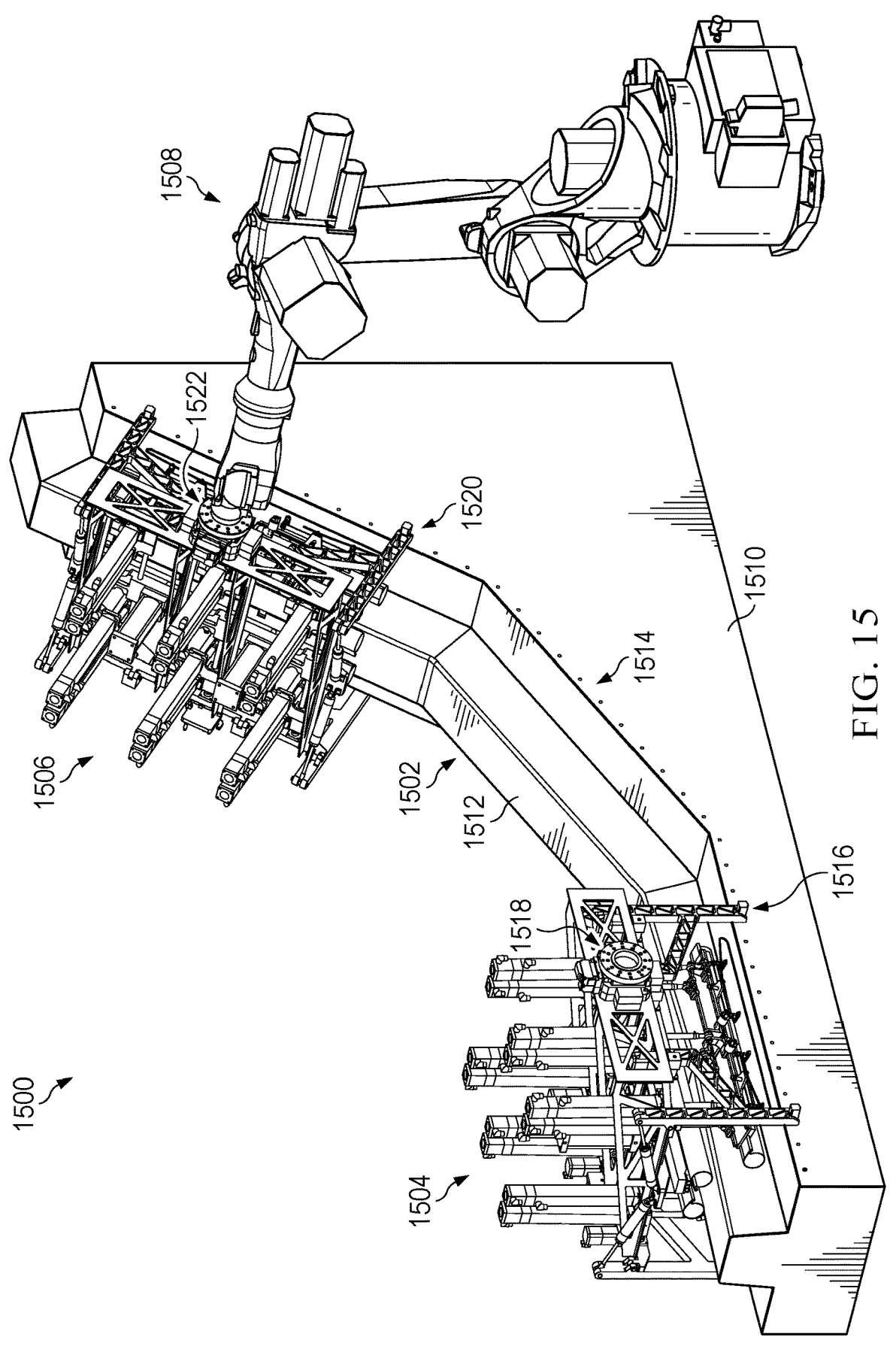
FIG. 15 is an illustration of an isometric view of forming end effectors positioned relative to a mandrel in accordance with an illustrative embodiment.

Turning now to FIG. 15, an illustration of an isometric view of forming end effectors positioned relative to a mandrel is depicted in accordance with an illustrative embodiment. Forming end effector 1504 and forming end effector 1506 are physical implementations of forming end effector 200 of FIG. 2. Mandrel 1502 is a physical implementation of mandrel 218 of FIG. 2. Forming end effector 1504 can be the same as forming end effector 300 of FIGS. 3-6. Forming end effector 1506 can be the same as forming end effector 300 of FIGS. 3-6. Forming end effector 1504 can be the same as forming end effector 902 of FIGS. 9-14. Forming end effector 1506 can be the same as forming end effector 902 of FIGS. 9-14.

In view 1500, forming end effector 1504 is connected to base 1510 of mandrel 1502 and is forming a composite material onto forming surface 1512 of mandrel 1502. In this illustrative example, engagement pins 1516 of forming end effector 1504 engage with holes 1514 in base 1510 of mandrel 1502. Engagement pins 1516 lock forming end effector 1504 to mandrel 1502.

After forming the composite material on mandrel 1502, forming end effector 1504 can be disconnected and moved away from mandrel 1502. In some illustrative examples, to move forming end effector 1504 away from mandrel 1502, robotic arm 1508 connects to forming end effector 1504 to disengage forming end effector 1504 from mandrel 1502 and move forming end effector 1504 away from mandrel 1502. In this illustrative example, robotic arm 1508 connects to forming end effector 1504 using utility port 1518.

In view 1500, forming end effector 1506 is being positioned relative to mandrel 1502 and connected to mandrel 1502. In view 1500, robotic arm 1508 is connected to forming end effector 1506 and is positioning forming end effector 1506 relative to mandrel 1502. Robotic arm 1508 is connected to utility port 1522 of forming end effector 1506. In this illustrative example, engagement pins 1520 of forming end effector 1506 will be used to engage with holes 1514 in base 1510 of mandrel 1502. Engagement pins 1520 will lock forming end effector 1506 to mandrel 1502.

As depicted, neither forming end effector 1504 or forming end effector 1506 is positioned over a bend in mandrel 1502. However, in some illustrative examples, at least one of forming end effector 1504 or forming end effector 1506 can be used on a bend of mandrel 1502 due to a set of compliant joints in the forming heads.

Figure 16:
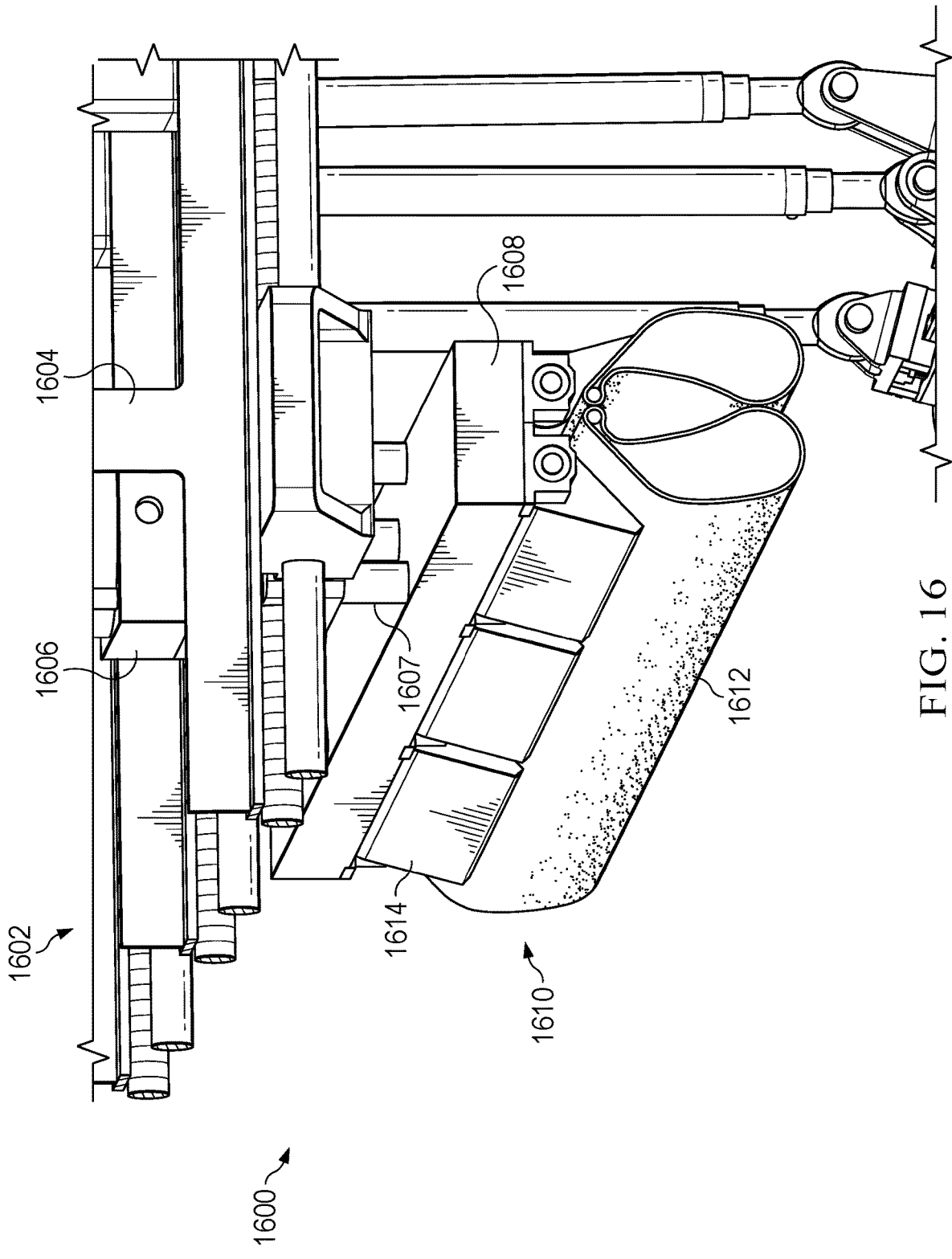
FIG. 16 is an illustration of an isometric view of a center actuator with center pressers of a forming end effector in accordance with an illustrative embodiment.

Turning now to FIG. 16, an illustration of an isometric view of a center actuator with center pressers of a forming end effector is depicted in accordance with an illustrative embodiment. In view 1600, forming end effector 1602 comprises center actuator 1606 connected to frame 1604. Forming end effector 1602 can be a physical implementation of forming end effector 200. Forming end effector 1602 can be the same as forming end effector 300 of FIGS. 3-6. Forming end effector 1602 can include leg 702 of FIG. 7. Forming end effector 1602 can be the same as forming end effector 802 of FIG. 8. Forming end effector 1602 can be the same as forming end effector 902 of FIGS. 9-14. Forming end effector 1602 can be the same as either of forming end effector 1504 or forming end effector 1506.

Center actuator 1606 of forming end effector 1602 is connected to frame 1604. Center actuator 1606 connected to frame 1604 is positioned between forming heads. Center actuator comprises extendable shafts 1607 connected to platform 1608. Center pressers 1610 are movably connected to center actuator 1606.

Center pressers 1610 comprise inflatable bladders 1612 movably connected to center actuator 1606. Center pressers 1610 comprise inflatable bladders 1612 connected to rotating pedals 1614. As depicted, inflatable bladders 1612 are not filled. Inflatable bladders 1612 are collapsed to conserve space. Rotating pedals 1614 can rotate away from each other to provide additional space to inflate inflatable bladders 1612.

Figure 17:
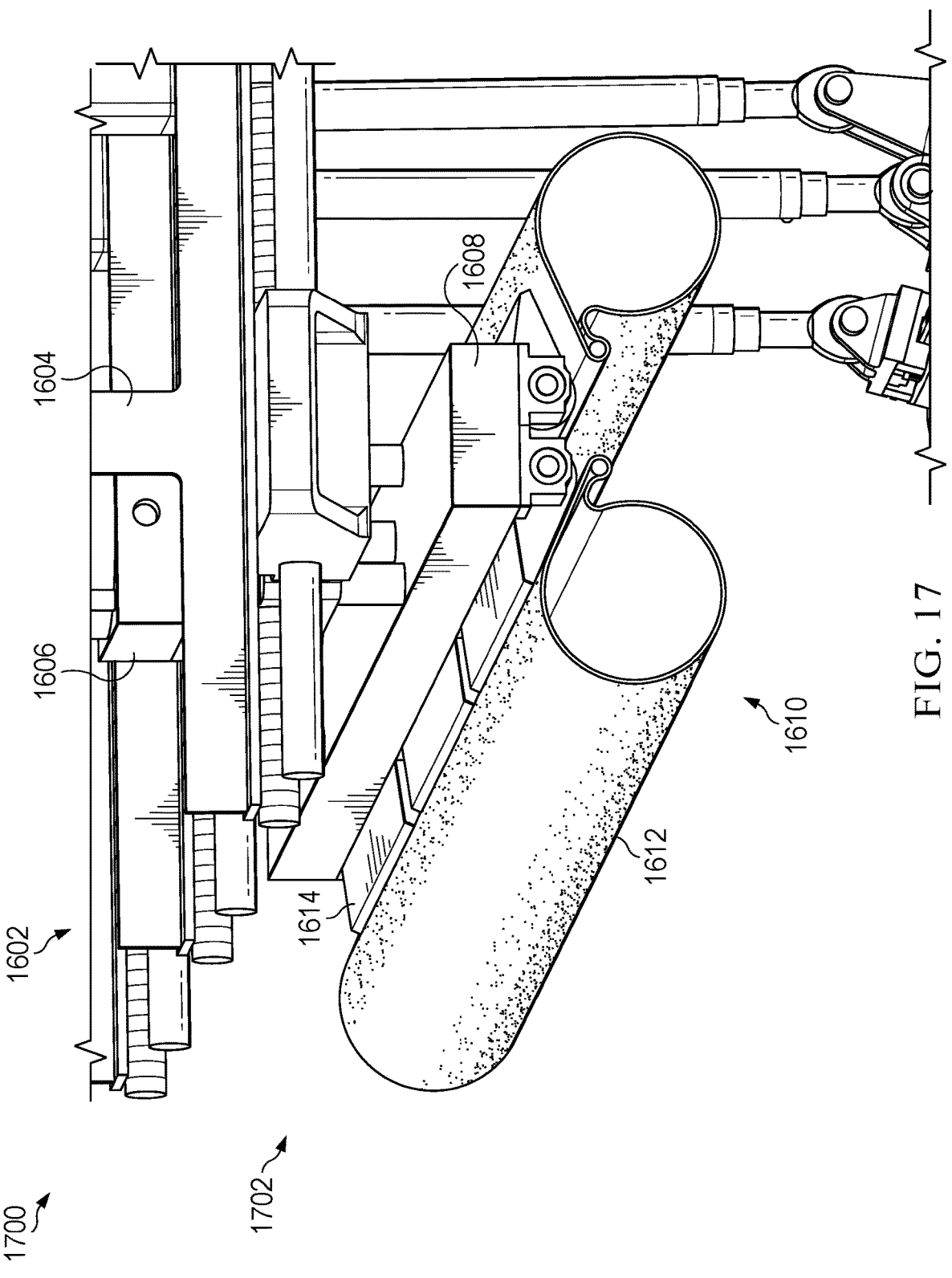
FIG. 17 is an illustration of an isometric view of a center actuator with center pressers of a forming end effector in accordance with an illustrative embodiment.

Turning now to FIG. 17, an illustration of an isometric view of a center actuator with center pressers of a forming end effector is depicted in accordance with an illustrative embodiment. In view 1700, center pressers 1610 are in extended position 1702. In extended position 1702, center pressers 1610 can be used to hold a center portion of a composite material against a forming surface of a mandrel.

Between view 1600 and view 1700, pedals 1614 have rotated outwardly away from a center of platform 1608. Platform 1608 acts as a hard stop for pedals 1614.

Figure 18:
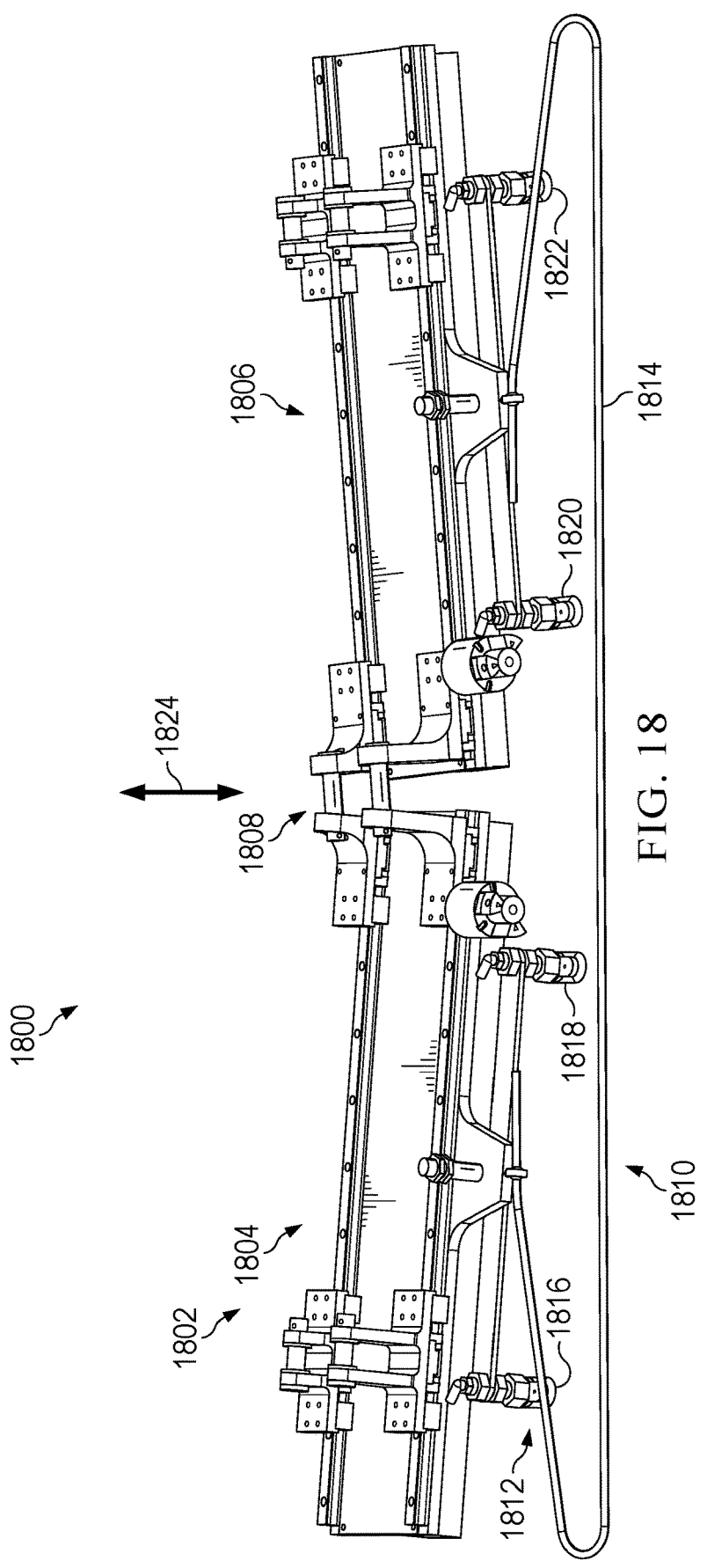
FIG. 18 is an illustration of an isometric view of a composite holding system of a forming end effector in accordance with an illustrative embodiment.

Turning now to FIG. 18, an illustration of an isometric view of a forming head and a respective composite holding system of a forming end effector is depicted in accordance with an illustrative embodiment. Forming head 1802 comprises portion 1804 and portion 1806 connected by set of compliant joints 1808. Set of compliant joints 1808 enables forming of a composite material on a mandrel with a bend.

Portion 1804 of forming head 1802 is a separate plate from portion 1806. Having two separate plates, portion 1804 and portion 1806 allows for flexing of forming head 1802. Set of compliant joints 1808 comprises rod ends with floating pins to allow for flexing. Set of compliant joints 1808 comprise compliant rod end and rail joints that allow for conforming to the kinks or bends in a mandrel.

Composite holding system 1810 is visible in view 1800. Composite holding system 1810 comprises vacuum pads 1812 and guard 1814. Vacuum pads 1812 comprise vacuum pad 1816, vacuum pad 1818, vacuum pad 1820, and vacuum pad 1822. As portion 1804 moves relative to portion 1806, vacuum pad 1816 and vacuum pad 1818 move relative to vacuum pad 1820 and vacuum pad 1822.

As depicted, set of compliant joints 1808 allows an angle between portion 1804 and portion 1806 in direction 1824. Direction 1824 may be referred to as a vertical direction.

Figure 19:
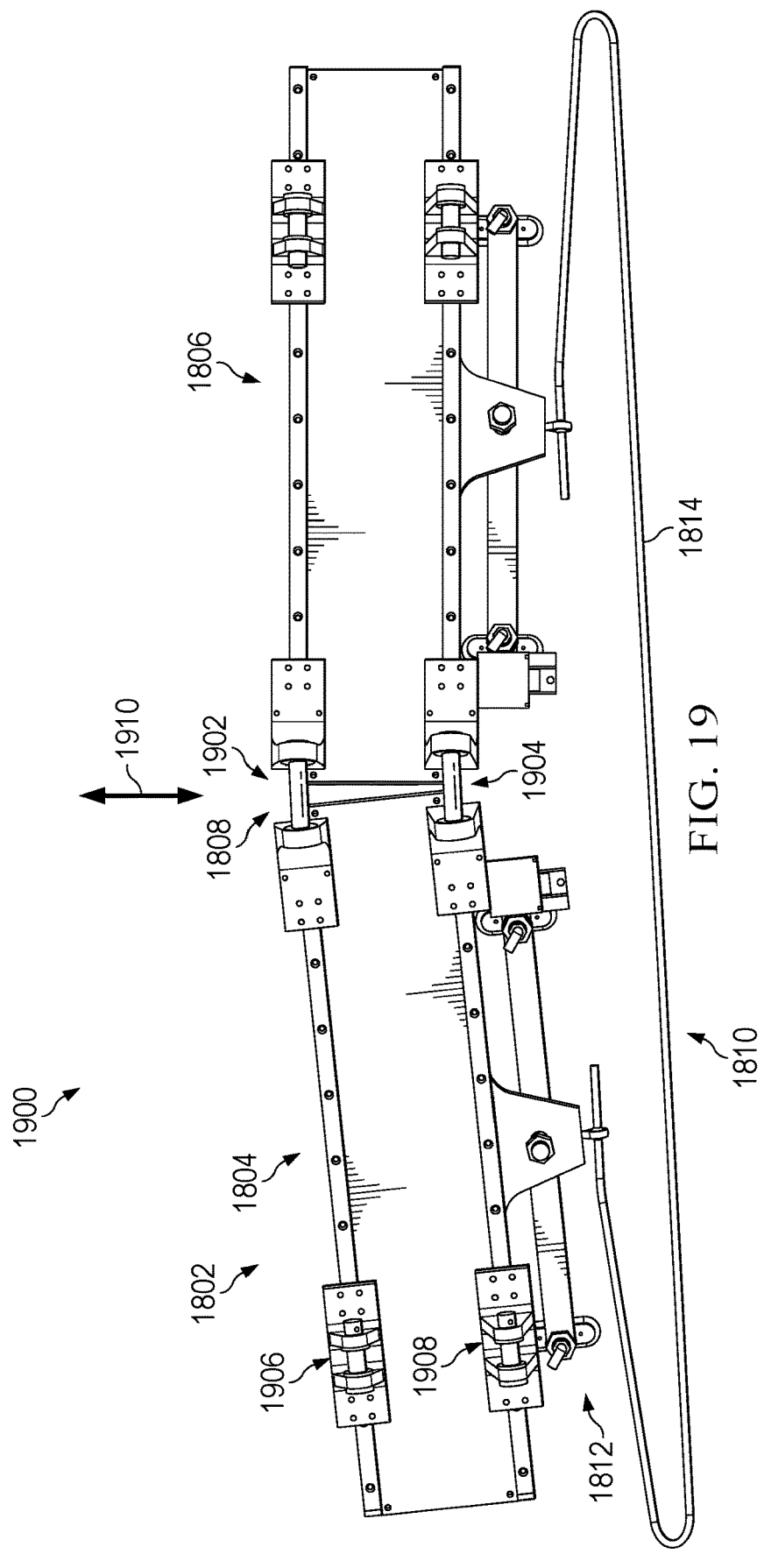
FIG. 19 is an illustration of a top view of a composite holding system of a forming end effector in accordance with an illustrative embodiment.

Turning now to FIG. 19, an illustration of a top view of a forming head and a respective composite holding system of a forming end effector is depicted in accordance with an illustrative embodiment. View 1900 is a view from direction 1824 of FIG. 18.

In view 1900, the floating pins of set of compliant joints 1808 are visible. Set of compliant joints 1808 comprise floating pin 1902 and floating pin 1904. The floating pins, floating pin 1902 and floating pin 1904, will extend through a respective rod end of a connection rod to join forming head 1802 to the forming end effector. Floating pin 1902 and floating pin 1904 are connected to outer rod ends that are part of forming head 1802.

In view 1900, movement of portion 1804 and portion 1806 can be moved in direction 1910. Movement in direction 1910 causes an edge of portion 1804 to be a varying distance from an edge of portion 1806. Movement in direction 1910 can be referred to as movement in a horizontal direction.

In this illustrative example, set of compliant joints 1808 forms part of first set of hinges 1906 and second set of hinges 1908. First set of hinges 1906 can include hinge 232 of FIG. 2. Second set of hinges 1908 can include hinge 233 of FIG. 2. Extending selected actuators to impart rotational sweeping comprises extending actuators connected to one of first set of hinges 1906 or second set of hinges 1908 more than the other of first set of hinges 1906 or second set of hinges 1908.

Turning now to FIG. 20, a flowchart of a method of forming a composite material onto a mandrel is depicted in accordance with an illustrative embodiment. Method 2000 can be used to form a composite component of aircraft 100 of FIG. 1. Method 2000 can be performed using forming end effector 200 of FIG. 2. Method 2000 can be performed using forming end effector 300 of FIGS. 3-6. Method 2000 can be performed using forming end effector 701 of FIG. 7. Method 2000 can be performed using forming end effector 802 of FIG. 8. Method 2000 can be performed using forming end effector 902 of FIGS. 9-14. Method 2000 can be performed using mandrel 1502 and at least one of forming end effector 1504 or forming end effector 1506 of FIG. 15. Method 2000 can be performed using a forming end effector having center pressers 1610 of FIGS. 16-17. Method 2000 can be performed using a forming end effector having composite holding system 1810 of FIGS. 18-19.

Method 2000 positions a forming end effector carrying the composite material over the mandrel (operation 2002). Method 2000 connects the forming end effector to the mandrel (operation 2004). Method 2000 sweeps the composite material onto the mandrel using sweepers of the forming end effector (operation 2006). Afterwards, method 2000 terminates.

In some illustrative examples, positioning the forming end effector over the mandrel comprises moving the forming end effector using a robotic arm (operation 2008). In some illustrative examples, the robotic arm is only used to transport and connect the forming end effector to the mandrel. In some illustrative examples, the robotic arm is used to move multiple forming end effectors to be connected to the mandrel.

In some illustrative examples, method 2000 disconnects the robotic arm from a utility port of the forming end effector after positioning the forming end effector (operation 2010). In some illustrative examples, method 2000 connects the forming end effector to utilities using the utility port prior to sweeping the composite material onto the mandrel (operation 2012). In some illustrative examples, the utilities are provided by the mandrel. In some illustrative examples, the utilities are provided by outlets on the manufacturing floor.

In some illustrative examples, connecting the forming end effector to the mandrel comprises locking the forming end effector to the mandrel using engagement pins (operation 2014). In some illustrative examples, the engagement pins are connected to legs of the forming end effector.

In some illustrative examples, method 2000 supplies at least one utility from the mandrel to the forming end effector through the engagement pins (operation 2016). In some illustrative examples, vacuum channels are present in the engagement pins to receive the at least one utility from the mandrel. In some illustrative examples, air pressure is supplied to the forming end effector from the mandrel through the engagement pins.

In some illustrative examples, sweeping the composite material onto the mandrel comprises urging the composite material against the mandrel using inflatable bladders of the sweepers (operation 2018). In some illustrative examples, urging the composite material comprises moving the inflatable bladders relative to the mandrel. In some illustrative examples, urging the composite material comprises moving the inflatable bladders along a forming surface of the mandrel.

In some illustrative examples, sweeping the composite material onto the mandrel comprises rotating the inflatable bladders prior to urging the composite material onto corners of the mandrel (operation 2020). In some illustrative examples, sweeping the composite material comprises rotational sweeping and translational sweeping. In some illustrative examples, the rotational sweeping and the translational sweeping can be performed independently. The rotational sweeping is an active rotation of the inflatable bladders. In some illustrative examples, the rotational sweeping is performed using a number of actuators.

In some illustrative examples, method 2000 reacts loads from the forming end effector into the mandrel during the sweeping (operation 2022). In some illustrative examples, reacting loads from the forming end effector comprises reacting loads from the forming end effector through legs of the forming end effector connected to the mandrel. In some illustrative examples, reacting loads from the forming end effector comprises reacting loads from the forming end effector through the engagement pins of the legs.

Figure 21:
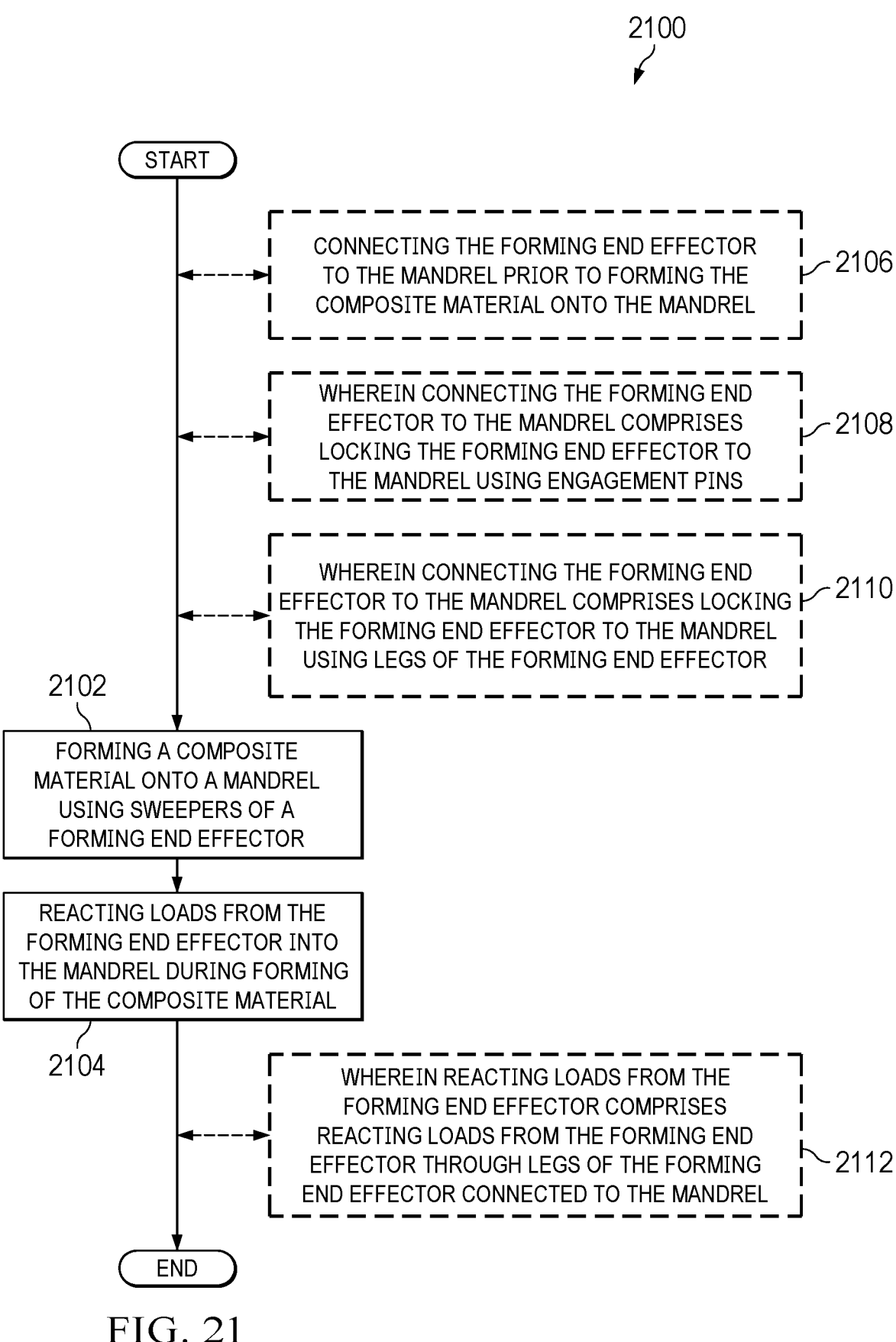
FIG. 21 is a flowchart of a method of forming a composite material onto a mandrel in accordance with an illustrative embodiment.

Turning now to FIG. 21, a flowchart of a method of forming a composite material onto a mandrel is depicted in accordance with an illustrative embodiment. Method 2100 can be used to form a composite component of aircraft 100 of FIG. 1. Method 2100 can be performed using forming end effector 200 of FIG. 2. Method 2100 can be performed using forming end effector 300 of FIGS. 3-6. Method 2100 can be performed using forming end effector 701 of FIG. 7. Method 2100 can be performed using forming end effector 802 of FIG. 8. Method 2100 can be performed using forming end effector 902 of FIGS. 9-14. Method 2100 can be performed using mandrel 1502 and at least one of forming end effector 1504 or forming end effector 1506 of FIG. 15. Method 2100 can be performed using a forming end effector having center pressers 1610 of FIGS. 16-17. Method 2100 can be performed using a forming end effector having composite holding system 1810 of FIGS. 18-19.

Method 2100 forms a composite material onto a mandrel using sweepers of a forming end effector (operation 2102). Method 2100 reacts loads from the forming end effector into the mandrel during forming of the composite material (operation 2104). Afterwards, method 2100 terminates.

In some illustrative examples, method 2100 connects the forming end effector to the mandrel prior to forming the composite material onto the mandrel (operation 2106). In some illustrative examples, connecting the forming end effector to the mandrel comprises locking the forming end effector to the mandrel using engagement pins (operation 2108). In some illustrative examples, the engagement pins are connected to legs of the forming end effector.

In some illustrative examples, connecting the forming end effector to the mandrel comprises locking the forming end effector to the mandrel using legs of the forming end effector (operation 2110). In some illustrative examples, engagement pins on the legs of the forming end effector lock the forming end effector to the mandrel. In some illustrative examples, engagement pins on the legs of the forming end effector lock the legs to holes on the base of the mandrel.

In some illustrative examples, reacting loads from the forming end effector comprises reacting loads from the forming end effector through legs of the forming end effector connected to the mandrel (operation 2112). In some illustrative examples, reacting loads from the forming end effector comprises reacting loads from the forming end effector through the engagement pins of the legs.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C, or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 2008 through operation 2022 may be optional. As another example, operation 2106 through operation 2112 may be optional.

Figure 22:
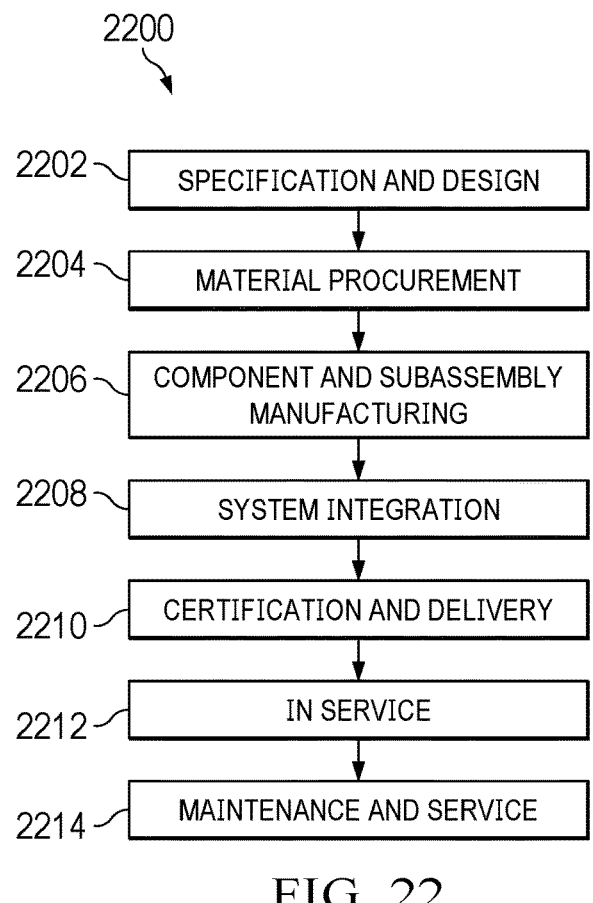
FIG. 22 is an illustration of an aircraft manufacturing and service method in a form of a block diagram in accordance with an illustrative embodiment.
Figure 23:
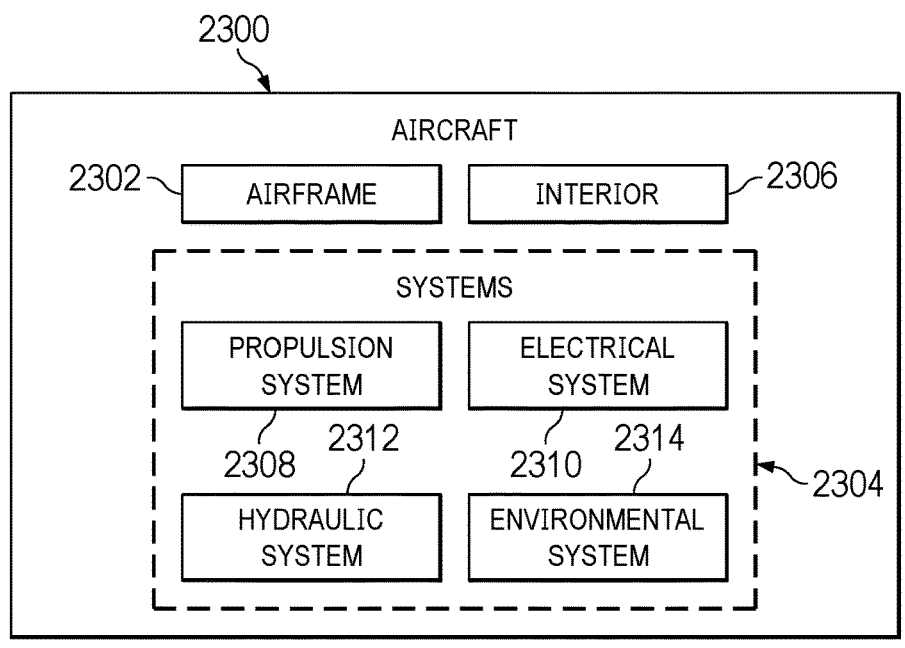
FIG. 23 is an illustration of an aircraft in a form of a block diagram in which an illustrative embodiment may be implemented.

Illustrative embodiments of the present disclosure may be described in the context of aircraft manufacturing and service method 2200 as shown in FIG. 22 and aircraft 2300 as shown in FIG. 23. Turning first to FIG. 22, an illustration of an aircraft manufacturing and service method in a form of a block diagram is depicted in accordance with an illustrative embodiment. During pre-production, aircraft manufacturing and service method 2200 may include specification and design 2202 of aircraft 2300 in FIG. 23 and material procurement 2204.

During production, component and subassembly manufacturing 2206 and system integration 2208 of aircraft 2300 takes place. Thereafter, aircraft 2300 may go through certification and delivery 2210 in order to be placed in service 2212. While in service 2212 by a customer, aircraft 2300 is scheduled for routine maintenance and service 2214, which may include modification, reconfiguration, refurbishment, or other maintenance and service.

Each of the processes of aircraft manufacturing and service method 2200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 23, an illustration of an aircraft in a form of a block diagram is depicted in which an illustrative embodiment may be implemented. In this example, aircraft 2300 is produced by aircraft manufacturing and service method 2200 of FIG. 22 and may include airframe 2302 with plurality of systems 2304 and interior 2306. Examples of systems 2304 include one or more of propulsion system 2308, electrical system 2310, hydraulic system 2312, and environmental system 2314. Any number of other systems may be included.

Apparatuses and methods embodied herein may be employed during at least one of the stages of aircraft manufacturing and service method 2200. One or more illustrative embodiments may be manufactured or used during at least one of component and subassembly manufacturing 2206, system integration 2208, in service 2212, or maintenance and service 2214 of FIG. 22.

The illustrative examples enable composite forming at multiple orientations using a robot system. The illustrative examples provide a forming end-effector that is designed with several articulating joints to allow for more complex forming sweeps, capable of compacting while preventing radius thinning. The forming end effector comprises a flat pre-cured composite picking system to transport and begin forming on a complex mandrel tool. The forming end effector of the illustrative examples is capable of forming composite material on a mandrel that would not be cost effective for designing a traditional gantry system. The forming end-effector is attached to the mandrel (tool) using several indexing pins that hold the forming end effector in place and allow for the robot to withdraw while the end-effector continues to form.

The forming end effector comprises utility couplers that continue to supply energy and air pressure. The use of forming end effectors that receive utilities independently of a robotic arm allows for multiple forming end-effectors to be placed onto a mandrel (tool) at desired locations.

In some illustrative examples, the forming end effector uses pins to attach the forming end-effector to the mandrel (tool) directly, which removes the stresses from deflecting the robot.

The sweepers for compacting/forming the composite are configured to actively rotate. The sweepers, which can take the form of inflatable bladders, are not fixed at a static angle. Rotating the sweepers can prevent radius thinning which can be created by applying compaction force with only translational sweeping around a corner of a mandrel. Rotating the sweepers allows the sweepers to apply enough compaction force without pulling the fibers of the composite material too much in tension around the bending corner. In some illustrative examples, the sweepers take the form of inflatable bladders.

In the illustrative examples, robotic arms attach the forming end-effector to a mandrel (tool), to create a rigid cage for forming. The use of a rolling sweeper is used in addition to compaction. The sweeper can take the form of an inflatable bladder. The ability to drop off the forming end-effector to operate without the robot allows the robotic asset to perform other tasks such as metrology on a previously formed portion of the tool. The forming end effectors can use a center compacting feature with fins (rotating pedals) that open to extend the compaction area at the top of the tool to hold the flat charge in place. In some illustrative examples, the use of linked plates in the forming heads for compaction allow for forming kinks and reaching within tool pits.

The use of legs and pins to connect the forming end effector and the mandrel allow for forming forces up from 3-10 kips, depending on the length of the forming part segment. The illustrative examples utilize rotating sweepers, such as inflatable bladders, for being able to control the compaction force and pulling tension independently. The forming end effector comprises a center compaction foot that expands.

The illustrative examples can allow for more complex composite forming as a larger or single piece. In some illustrative examples, the robotic arm can be a commercially off the shelf robots. A commercially available robot may be easily maintained and/or replaced in production. Maintaining or replacing a robotic arm may be less time consuming or less expensive than a large custom gantry going offline and affecting production rate.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a composite material onto a mandrel, the method comprising:

performing the steps below using a forming end effector comprising:

a frame;

a number of legs movably connected to the frame, wherein the number of legs comprise engagement pins;

forming heads with sweepers each movably connected to the frame, respectively, by a number of actuators movably connected to the frame;

a center actuator connected to the frame between the forming heads; and center pressers movably connected to the center actuator;

positioning the forming end effector carrying the composite material over the mandrel;

connecting the forming end effector to the mandrel; and sweeping the composite material onto the mandrel using sweepers of the forming end effector.

2. The method of claim 1, wherein positioning the forming end effector over the mandrel comprises moving the forming end effector using a robotic arm.

3. The method of claim 2, further comprising:

disconnecting the robotic arm from a utility port of the forming end effector after positioning the forming end effector; and connecting the forming end effector to utilities using the utility port prior to sweeping the composite material onto the mandrel.

4. The method of claim 1, wherein connecting the forming end effector to the mandrel comprises locking the forming end effector to the mandrel using engagement pins.

5. The method of claim 4, further comprising:

supplying at least one utility from the mandrel to the forming end effector through the engagement pins.

6. The method of claim 1, wherein sweeping the composite material onto the mandrel comprises urging the composite material against the mandrel using inflatable bladders of the sweepers.

7. The method of claim 6, wherein sweeping the composite material onto the mandrel comprises rotating the inflatable bladders prior to urging the composite material onto corners of the mandrel.

8. The method of claim 1, further comprising:

reacting loads from the forming end effector into the mandrel during the sweeping.

9. A forming end effector configured to form a composite material, wherein the forming end effector comprises:

a frame;

a number of legs movably connected to the frame, wherein the number of legs comprise engagement pins;

forming heads with sweepers each movably connected to the frame, respectively, by a number of actuators movably connected to the frame;

a center actuator connected to the frame between the forming heads; and center pressers movably connected to the center actuator.

10. The forming end effector of claim 9, wherein the engagement pins are configured to connect the forming end effector to a mandrel.

11. The forming end effector of claim 9, wherein the legs are configured to react to loads from the forming end effector into a mandrel configured to support the composite material.

12. The forming end effector of claim 9, wherein the forming heads further comprise vacuum pads configured to hold the composite material prior to forming.

13. The forming end effector of claim 9, wherein the sweepers take the form of inflatable bladders.

14. The forming end effector of claim 9, wherein the forming heads are connected to the number of actuators by pairs of hinges configured to rotate the sweepers relative to a mandrel beneath the frame.

15. The forming end effector of claim 9, wherein the center pressers comprise inflatable bladders movably connected to the center actuator.

16. The forming end effector of claim 9, further comprising:

a utility port connected to the frame, the utility port configured to interface with a robotic arm for transportation of the forming end effector and configured to interface with utilities for forming operations independently of a robotic arm.

17. The forming end effector of claim 9, wherein the engagement pins are further configured to receive at least one utility through the engagement pins and transport the utility to other components of the forming end effector.

18. A forming end effector configured to form a composite material, wherein the forming end effector comprises:

a frame;

forming heads each comprising, respectively, sweepers movably connected to the frame by a number of actuators movably connected to the frame and connected to the forming heads by pairs of hinges;

a center actuator connected to the frame between the forming heads; and center pressers movably connected to the center actuator.

19. The forming end effector of claim 18, wherein the number of actuators is connected to the forming heads by the pairs of hinges such that the forming heads are configured to rotate to form the composite material.

20. The forming end effector of claim 18, wherein the sweepers comprise inflatable bladders and wherein the pairs of hinges comprise a first hinge a first distance away from a forming head in the forming heads and a second hinge a second distance away from the forming head, wherein a difference between the first distance and the second distance enables rotation of the sweepers for forming the composite material around edges.

21. The forming end effector of claim 18, wherein each of the forming heads comprises a composite holding system for carrying the composite material to be formed.

22. The forming end effector of claim 18 further comprising:

a number of legs movably connected to the frame, the number of legs having engagement pins configured to connect the forming end effector to a mandrel and react loads from the forming end effector into the mandrel during forming of the composite material.

23. The forming end effector of claim 18, wherein each of the forming heads comprises a set of compliant joints to provide forming of the composite material on a mandrel with a bend.

24. A method comprising:

performing the steps below using a forming end effector comprising:

a frame;

a number of legs movably connected to the frame, wherein the number of legs comprise engagement pins;

forming heads with sweepers each movably connected to the frame, respectively, by a number of actuators movably connected to the frame;

a center actuator connected to the frame between the forming heads; and center pressers movably connected to the center actuator;

forming a composite material onto a mandrel using sweepers of a forming end effector; and reacting loads from the forming end effector into the mandrel during forming of the composite material.

\* \* \* \* \*